United States Patent
Tsuji et al.

(10) Patent No.: US 6,503,995 B2
(45) Date of Patent: Jan. 7, 2003

(54) METHOD OF PRODUCING CROSSLINKABLE SILYL GROUP-CONTAINING POLYOXYALKYLENE POLYMERS

(75) Inventors: Ryotaro Tsuji, Osaka (JP); Yousuke Asai, Osaka (JP); Masayuki Fujita, Osaka (JP); Hajime Harada, Osaka (JP); Susumu Kyotani, Hyogo (JP); Takeshi Kawamura, Hyogo (JP); Kenji Kuroda, Hyogo (JP); Hiroshi Iwakiri, Hyogo (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/832,344

(22) Filed: Apr. 11, 2001

(65) Prior Publication Data

US 2002/0013427 A1 Jan. 31, 2002

(30) Foreign Application Priority Data

Apr. 12, 2000 (JP) ........................... 2000-110860
Sep. 4, 2000 (JP) ........................... 2000-266509
Sep. 4, 2000 (JP) ........................... 2000-266510

(51) Int. Cl.$^7$ ............................................. C08G 77/12
(52) U.S. Cl. ........................ 528/31; 525/403; 568/673; 568/303; 528/76; 528/414; 528/412; 528/15; 562/400; 562/887
(58) Field of Search ..................... 525/403; 568/673, 568/303; 528/76, 414, 412, 31, 15; 562/400, 887

(56) References Cited

U.S. PATENT DOCUMENTS 4,987,271 A * 1/1991 Watabe et al.

FOREIGN PATENT DOCUMENTS

| EP | 0 589 635 | 3/1994 |
| JP | 48-36960 | 11/1973 |
| JP | 11-246770 | 9/1999 |

OTHER PUBLICATIONS

Patent Abstracts of Japan, vol. 017, No. 492 (C–1107), Sep. 7, 1993 and JP 05 125176 A (Asahi Glass Co. Ltd), May 21, 1993.

* cited by examiner

*Primary Examiner*—Robert Dawson
*Assistant Examiner*—Kuo-Liang Peng
(74) *Attorney, Agent, or Firm*—Armstrong, Westerman & Hattori, LLP

(57) ABSTRACT

A method of producing a polyoxyalkylene polymer having at least one crosslinkable silyl group and at least one hydroxyl group in each molecule which comprises treating a polyoxyalkylene polymer having at least one unsaturated group and at least one alcoholic hydroxyl group in each molecule and an impurity double metal cyanide complex as mixed therein with a metal-coordinating compound and adding a compound having a hydrogen-silicon bond and a crosslinkable silyl group in each molecule and a hydrosilylation catalyst to thereby carry out the hydrosilylation reaction.

20 Claims, No Drawings

METHOD OF PRODUCING CROSSLINKABLE SILYL GROUP-CONTAINING POLYOXYALKYLENE POLYMERS

FIELD OF THE INVENTION

The present invention relates to a method of producing a crosslinkable silyl group-containing polyoxyalkylene polymer and a method of producing a polyoxyalkylene polymer containing at least one crosslinkable silyl group and at least one hydroxy group.

PRIOR ART

Crosslinkable silyl group-containing polyoxyalkylene polymers are widely used as raw material polymers in sealing materials, adhesives, coating materials and the like for architectural or industrial use. As illustrated in Japanese Kokai Publication Sho-50-156599, Japanese Kokai Publication Sho-52-73998 and Japanese Kokai Publication Hei-03-72527, for instance, such crosslinkable silyl group-containing polyoxyalkylene polymers are produced mainly by introducing an unsaturated group such as an allyl or methallyl group into a polyoxyalkylene polymer utilizing its terminal hydroxyl group and reacting the thus-produced unsaturated group-terminated polyoxyalkylene polymer with a compound having a hydrogen-silicon bond and a crosslinkable silyl group in each molecule in the manner of hydrosilylation. However, in such production processes, byproducts or impurities, such as salts, are formed in the step of unsaturated group introduction and, therefore, a step of purification for the purpose of removing these is required. Thus problems arise, namely the production process becomes lengthy and complicated and a large amount of waste is generated.

As a method of producing a crosslinkable silyl group-containing polyoxyalkylene polymer which may possibly reduce the formation of byproducts and shorten the production process, there may be mentioned, for example, the method disclosed in Japanese Kokai Publication Hei-3-79627 which comprises subjecting a monoepoxide not having an unsaturated group to ring opening polymerization using a double metal cyanide complex catalyst, then reacting the polymerization product with an unsaturated group-containing monoepoxide and reacting the thus-produced, polyoxyalkylene polymer having at least one unsaturated group and at least one alcoholic hydroxyl group with a compound having a hydrogen-silicon bond and a crosslinkable silyl group in each molecule in the manner of hydrosilylation.

According to this production method, such byproducts as salts are not formed in the step of unsaturated group introduction. However, the double metal cyanide complex used as the catalyst becomes mixed in the polyoxyalkylene polymer. This double metal cyanide complex is capable of inhibiting the hydrosilylation reaction and, further, capable of promoting the dehydration condensation reaction between a hydrogen-silicon bond and a hydroxyl group, the condensation reaction between a hydroxyl group and a crosslinkable silyl group or the disproportionation reaction of substituents on a silicon atom. Therefore, problems arise when the hydrosilylation reaction is carried out without removing the double metal cyanide complex from the polyoxyalkylene polymer; for example, the hydrosilylation yield will be low, or the condensation reaction of a hydrogen-silicon bond with a hydroxyl group proceeds, resulting in an increased viscosity, or the condensation reaction of a crosslinkable silyl group with a hydroxyl group progresses, also resulting in an increased viscosity. If such side reactions involving the hydroxyl group proceeds, it becomes difficult to carry out a further reaction utilizing the hydroxyl group. Therefore, for realizing efficient crosslinkable silyl group introduction and retaining the hydroxyl group in the polymer at a high remaining percentage, it is necessary to remove the double metal cyanide complex or purify the polymer prior to hydrosilylation. This produces a problem, namely renders the production process complicated.

Further, a method of producing a polyoxyalkylene polymer having at least one crosslinkable silyl group and at least one hydroxyl group in each molecule is disclosed in Japanese Kokai Publication Hei-05-125176 which comprises reacting a polyoxyalkylene polymer having at least one unsaturated group and at least one alcoholic hydroxyl group in each molecule as produced by using a double metal cyanide complex with a compound having a hydrogen-silicon bond and a crosslinkable silyl group in each molecule in the manner of hydrosilylation. However, when the method disclosed in the above-cited publication is carried out without removing the double metal cyanide complex, the hydrosilylation yield is low and the percentage of the remaining hydroxyl group in the polymer is low. In addition to these problems, the low percentage of the hydroxyl group in polymer causes a problem; when a reaction utilizing the hydroxyl group, for example the coupling reaction, is carried out, the yield is low. If the double metal cyanide complex is eliminated from the polyoxyalkylene polymer, or the polymer is purified, for solving such problems, the production process will become lengthy and complicated and problems of waste water and waste generation, for instance, will arise.

Another method of producing a crosslinkable silyl group-containing polyoxyalkylene polymer is described in Japanese Kokai Publication Hei-05-43679 and Japanese Kokai Publication Hei-06-172648 which comprises mutually coupling two allyl-terminated polyoxyalkylene monool molecules and then subjecting the coupling product to hydrosilylation with an alkoxysilane. However, it is a problem with this method that the coupling reaction catalyst often inhibits the hydrosilylation reaction. There is another problem: when the coupling reaction is carried out using an isocyanato group-containing compound, for instance, the hydrosilylation catalyst is required in large amounts since the urethane bond inhibits the hydrosilylation reaction. This is economically disadvantageous. There are further problems; when the allyl-terminated polyoxyalkylene monool is produced by polymerization using a double metal cyanide complex as a catalyst, the double metal cyanide complex remaining in the polymer inhibits the hydrosilylation reaction, so that a purification step is required or it is necessary to use the hydrosilylation catalyst in large amounts.

In view of the above-mentioned state of the art, it is an object of the present invention to provide a method of producing a polyoxyalkylene polymer having at least one crosslinkable silyl group and at least one hydroxyl group in each molecule expediently in high yields from polyoxyalkylene polymers having at least one unsaturated group and at least one alcoholic hydroxyl group in each molecule substantially without removing impurities, in particular the double metal cyanide complex, from the starting polymers or without purifying the same.

Another object of the invention is to provide a method of producing a crosslinkable silyl group-containing polyoxyalkylene polymer expediently in high yields by preparing polyoxyalkylene polymers having at least one crosslinkable silyl group and at least one hydroxyl group in each molecule from polyoxyalkylene polymers having at least one unsaturated group and at least one alcoholic hydroxyl group in each molecule substantially without removing impurities, in particular the double metal cyanide complex, therefrom or without purifying the same while suppressing side reactions in which the crosslinkable silyl group and/or hydroxyl group is involved and further carrying out the coupling reaction in which the hydroxyl group is involved, while suppressing side reactions such as condensation reactions in which the crosslinkable silyl group and/or hydroxyl group is involved.

SUMMARY OF THE INVENTION

The invention thus provides a method of producing a polyoxyalkylene polymer having at least one crosslinkable silyl group and at least one hydroxyl group in each molecule which comprises treating a polyoxyalkylene polymer having at least one unsaturated group and at least one alcoholic hydroxyl group in each molecule and an impurity double metal cyanide complex as mixed therein with a metal-coordinating compound, then adding a compound having a hydrogen-silicon bond and a crosslinkable silyl group in each molecule and a hydrosilylation catalyst to thereby carry out the hydrosilylation reaction.

The invention further provides a method of producing a crosslinkable silyl group-containing polyoxyalkylene polymer which comprises (a) treating a polyoxyalkylene polymer having at least one unsaturated group and at least one alcoholic hydroxyl group in each molecule and an impurity metal-coordinating compound mixed therein with a metal-coordinating compound, then adding thereto a compound having a hydrogen-silicon bond and a crosslinkable silyl group in each molecule and a hydrosilylation catalyst to thereby carry out the hydrosilylation reaction to give a polyoxyalkylene polymer having at least one crosslinkable silyl group and at least one hydroxyl group in each molecule and (b) carrying out the coupling reaction in which the hydroxyl group occurring in the polymer is involved.

DETAILED DESCRIPTION OF THE INVENTION

According to the invention, the polymer is treated with a metal-coordinating compound prior to hydrosilylation so that the hydrosilylation reaction may be carried out substantially without causing side reactions under conditions such that impurities such as the double metal cyanide complex, the hydroxyl group and the crosslinkable silyl group are present. By doing so, the remaining percentage of the hydroxyl group in the product polyoxyalkylene polymer having at least one crosslinkable silyl group and at least one hydroxyl group in each molecule can be retained at a high amount and the crosslinkable silyl group can also be retained without undergoing any condensation reaction.

Further, according to the invention, the crosslinkable silyl group-containing polyoxyalkylene polymer can be produced in high yields by subjecting the polyoxyalkylene polymer having at least one crosslinkable silyl group and at least one hydroxyl group in each molecule, following the above hydrosilylation reaction, to coupling utilizing the hydroxyl group thereof while suppressing side reactions in which the crosslinkable silyl and/or hydroxyl group is involved, substantially without the necessity of purifying the polyoxyalkylene polymer.

Step (a)

The polyoxyalkylene-based polymer having at least one crosslinkable silyl group and at least one hydroxyl group in each molecule, which is to be used in the practice of the invention may contain a double metal cyanide complex. Examples of such double metal cyanide complex are described in U.S. Pat. Nos. 3,278,457, 3,278,458, 3,278,459, 3,427,256, 3,427,334, 3,427,335, 3,829,505, 3,941,849, 4,355,188, 4,472,560, 4,721,818, 4,843,054, 5,158,922, Japanese Kokai Publication Hei-04-145123, Japanese Kokai Publication Hei-07-196778, Japanese Kokai Publication Hei-08-311171, Japanese Kokai Publication Hei-08-104741, Japanese Kokai Publication Hei-09-59373, WO 9740086, WO 9723544 and Macromolecular Synthesis, vol. 5, pp. 9 ff., 1974, among others. Specifically, they are represented by the following general formula (2):

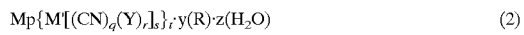

$$Mp\{M'[(CN)_q(Y)_r]_s\}_t \cdot y(R) \cdot z(H_2O) \tag{2}$$

(In the formula, M is a metal selected from the group consisting of Zn(II), Fe(II), Fe(III), Co(II), Ni(II), Al(III), Sr(II), Mn(II), Cr(II), Cu(II), Sn(II), Pb(II), Mo(IV), Mo(VI), W(IV) and W(VI). M' is a metal selected from the group consisting of Fe(II), Fe(III), Co(II), Co(III), Cr(II), Cr(III), Mn(II), Mn(III), Ni(II), V(IV) and V(V). Y is a group selected from the group consisting of Cl, Br, I, OH, NO, $C_2O_4$, $SO_4$, CNS, CNO, NCO and NCS. R is an organic ligand selected from the group consisting of ketones, ethers, polyethers, aldehydes, esters, alcohols and amides. These M, M', Y and R may each comprise a single species or a combination of a plurality of species. p, q, r, s and t each is a positive number which varies depending on the valence or coordination number of the metal atom and y and z each is a natural number which varies depending on the coordination number of the metal and/or on the drying conditions.

For the reason that the activity thereof as the polymerization catalyst is high, Zn(II) is preferred as M in general formula (2) and Fe(II), Fe(III), Co(II) and Co(III) are preferred as M' in general formula (2), and ethers, polyethers and alcohols, in particular dimethoxyethane, diethylene glycol dimethyl ether, polyoxypropylene diol, polyoxypropylene triol, tertiary hydroxyl-containing polyoxypropylene polyol, tert-butanol and isopropyl alcohol, are preferred as the organic ligand R.

Zinc hexacyanocobaltate-containing complexes are preferred as the double metal cyanide complex for the reason that their activity is high when they are used as polymerization catalysts. More preferred are zinc hexacyanocobaltate-dimethoxyethane complex, zinc hexacyanocobaltate-tert-butanol complex, zinc hexacyanocobaltate-tert-butanol and polyoxypropylene diol complex, zinc hexacyanocobaltate-tert-butanol and polyoxypropylene triol complex. For the reason that the activity thereof as the polymerization catalyst is high, those double metal cyanide complexes at least 70% of which is substantially noncrystalline are preferred and those at least 90% of which is substantially noncrystalline are more preferred.

The amount of the double metal cyanide complex in the polyoxyalkylene polymer having at least one unsaturated group and at least one alcoholic hydroxyl group in each molecule is not particularly restricted but generally is 0.0001 to 15 parts by weight, preferably 0.0005 to 0.1 part by weight, most preferably 0.005 to 0.05 part by weight, per 100 parts by weight of the polyoxyalkylene polymer. When the amount is less than 0.0001 part by weight, no sufficient polymerization activity will be obtained in many instances. In an amount exceeding 15 parts by weight, the yield will be low in the hydrosilylation reaction step or side reaction will be promoted, or a precipitate may be formed in the polymer in certain instances.

The polyoxyalkylene polymer having at least one unsaturated group and at least one alcoholic hydroxyl group in each molecule, which is to be used in the practice of the invention, can be obtained, for example, by subjecting an epoxy compound to ring opening polymerization using an unsaturated group- and active hydrogen-containing compound as a polymerization initiator and the above-mentioned double metal cyanide complex as a catalyst or by subjecting an unsaturated group-free monoepoxide and an unsaturated group-containing monoepoxide to ring opening polymerization using an unsaturated group-free, active hydrogen-containing compound as a polymerization initiator and the above-mentioned double metal cyanide complex as a catalyst. The method of preparing the above polymer is not limited to these, however.

The active hydrogen-containing compound that can be used as a polymerization initiator is not particularly restricted but may be any of those compounds which are applicable in association with double metal cyanide complexes. Preferred from the high reactivity viewpoint, however, are compounds containing an alcoholic hydroxyl, phenolic hydroxyl or carboxyl group, and compounds containing an alcoholic hydroxyl group are particularly preferred.

The alcoholic hydroxyl-containing compound is not particularly restricted but includes allyl alcohol, methallyl alcohol, trimethylolpropane monoallyl ether, trimethylolpropane diallyl ether, glycerol monoallyl ether, glycerol diallyl ether; ethylene oxide adducts or propylene oxide adducts thereof and like compounds containing at least one unsaturated group and at least one alcoholic hydroxyl group in each molecule; low-molecular polyhydric alcohols such as ethylene glycol, propylene glycol dipropylene glycol, glycerol, trimethylolpropane and pentaerythritol; propylene oxide adducts of these low-molecular polyhydric alcohols; polyether polyols such as polyoxypropylene glycol, polyoxypropylene triol and polyoxypropylene tetraol; hydroxyl-terminated hydrocarbon compounds such as hydroxyl-terminated polybutadiene and hydrogenated hydroxyl-terminated polybutadiene; alcoholic hydroxyl-terminated silicone compounds such as alcoholic hydroxyl-terminated polydimethylsiloxane; and the like. Water can also be used as the active hydrogen-containing compound. Among these active hydrogen-containing compounds to serve as polymerization initiators, compounds having an unsaturated group and an alcoholic hydroxyl group in each molecule are preferred for the reason that no unsaturated group introduction is needed after polymerization. In view of the availability and reactivity, allyl alcohol, allyl alcohol-propylene oxide adducts, methallyl alcohol and methallyl alcohol-propylene oxide adducts are particularly preferred. Such active hydrogen-containing compounds serving as polymerization initiators may be used singly or a plurality thereof may be used in combination.

The monoepoxide to be subjected to ring opening polymerization using a double metal cyanide complex is not particularly restricted but includes, among others, monoepoxides having no unsaturated group such as ethylene oxide, propylene oxide, butene oxide, isobutene oxide, epichlorohydrin and styrene oxide; and unsaturated group-containing monoepoxides such as allyl glycidyl ether, methallyl glycidyl ether, glycidyl acrylate, glycidyl methacrylate, butadiene monoxide and cyclopentadiene monoxide. Among these, propylene oxide, allyl glycidyl ether and methallyl glycidyl ether are preferred for the reason that they are easy to handle. These may be used singly or a plurality thereof may be used in combination.

The molecular weight of the polyoxyalkylene polymer having at least one unsaturated group and at least one alcoholic hydroxyl group in each molecule, which is to be used in the practice of the invention, is not particularly restricted but, when expressed in terms of number average molecular weight, it is preferably not less than 1,500, more preferably not less than 3,000, and it is preferably not more than 50,000, more preferably not more than 30,000. The number average molecular weight can be determined by measuring the terminal groups. Specifically, when the polyoxyalkylene polymer is linear type polymer, the molecular weight can be determined by obtaining a hydroxyl value (OHV; meq/g) per a unit weight and an unsaturated value (IV; meq/g) from a known method, followed by calculating it with the formula: 2000/(IV+OHV). When it is lower than 1,500, the viscosity is too low and, when it exceeds 50,000, the viscosity is excessively high, making the handling difficult in certain instances.

For reasons of good heat resistance and weathering resistance, the polyoxyalkylene polymer to be used in the practice of the invention is preferably one in which propylene oxide units accounts for at least 50% by weight, more preferably at least 90% by weight, of the polymer.

The polyoxyalkylene polymer having at least one unsaturated group and at least one alcoholic hydroxyl group in each molecule, which is to be used in the practice of the invention, may comprise either a single species or a combination of a plurality of species thereof.

The metal-coordinating compound to be used in the practice of the invention is a compound capable of coordination to a metal ion or metal atom (in particular a metal ion or metal atom in a double metal cyanide complex). The term "coordination" as used herein is defined as "donation of an electron pair from an electron pair donor to an electron pair acceptor" as so described in Kagaku Daijiten (Encyclopedic Dictionary of Chemistry) (1st edition; published by Tokyo Kagaku Dojin). The same dictionary further describes that "the term coordination is generally used when a metal ion or metal atom serves as the electron pair acceptor; that which serves as an electron pair donor is called ligand, and that which can serve as a ligand includes molecules having a lone electron pair, such as $NH_3$, $P(C_6H_5)_3$ and $S(CH_3)_2$, and anions such as $Cl^-$ and $NCS^-$." Thus, the metal-coordinating compound to be used in the practice of the invention is a compound capable of serving as a ligand for a metal ions or metal atom or a compound containing a structure capable of serving as a ligand.

Preferred as such metal-coordinating compound are carboxylic acids, carboxylic acid derivatives, chelating agents and phenolic hydroxyl-containing compounds because of their high coordinating ability.

The term "chelating agent" as used herein is defined as "a reagent having a plurality of donor atoms binding to a metal ion to form a chelate compound" as described in Kagaku Daijiten (1st edition; published by Tokyo Kagaku Dojin). Further, according to the same dictionary, "chelation refers to the formation of a cyclic compound (chelate compound) resulting from coordination of both of the two coordinating atoms occurring in a ligand to one and the same ion or atom (generally a metal ion or metal atom); the term is used not only in the case of formation of a monocyclic compound but also in the case of there being three or more coordinating atoms (formation of two or more rings)".

The chelating agents are currently used as masking agents, reagents for chelatometric titration, reagents for colorimetric analysis, metal indicators, detergents, stabilizers, metal extractants, metal precipitating agents, reagents for gravimetric analysis, reagents for colorimetry and so forth. Preferred as carboxyl-free chelating agents are compounds represented by the general formula (1):

RC(O)CH$_2$C(O)R  (1)

wherein the two R's are the same or different and each represents a substituted or unsubstituted alkyl group, a substituted or unsubstituted cycloalkyl group, a substituted or unsubstituted aryl group, a substituted or unsubstituted univalent heterocyclic group or a substituted or unsubstituted aralkyl group, because of their ability to coordinate to metals and their availability. As the substituent(s), there may be mentioned halogen groups, among others.

Among the metal-coordinating compounds to be used in the practice of the invention, the carboxylic acids specifically include, but are not limited to, monobasic carboxylic acids such as formic acid, acetic acid, chloroacetic acid, dichloroacetic acid, trichloroacetic acid, 2-ethylhexanoci acid, salicylic acid, p-hydroxybenzoic acid, stearic acid, glycolic acid, butyric acid, gallic acid, cinnamic acid, glycine, lactic acid, tiglic acid, aspartic acid, trifluoroacetic acid, benzoic acid, naphthoic acid, monomethyl succinate, monoethyl succinate, monomethyl maleate and monoethyl maleate; polybasic carboxylic acids such as succinic acid, phthalic acid, malonic acid, malic acid, glutamic acid, itaconic acid, maleic acid, adipic acid, aspartic acid, citric acid, tartaric acid, sebatic acid, thiodipropionic acid, thiomalic acid, iminodiacetic acid, isophthalic acid, 2-carboxyphenylacetic acid, cyclohexane-1,2-dicarboxylic acid, cyclohexane-1,3-dicarboxylic acid, oxalic acid, glutaric acid, benzenetricarboxylic acids and ethylenediaminetetraacetic acid; and carboxyl-containing polymers such as polyacrylic acid and acrylic acid copolymers.

The carboxylic acid derivatives include as usable species, but are not limited to, compounds capable of generating a carboxyl group(s) in the system, for example carboxylic acid anhydrides such as succinic anhydride, phthalic anhydride, itaconic anhydride, maleic anhydride, glutaric anhydride, acetic anhydride, trifluoroacetic anhydride, propionic anhydride and benzoic anhydride; silylated carboxylic acids such as trimethylsilylformate, trimethylsilyl acetate, trimethylsilyl propionate, trimethylsilyl benzoate, trimethylsilyl trifluoroacetate, dimethyldiacetoxysilane, diphenyldiacetoxysilane, methyltriacetoxysilane, vinyltriacetoxysilane and silicon tetrabenzoate; and the like. These may be used singly or a plurality thereof may be used in combination.

Among the metal-coordinating compounds to be used in the practice of the invention, the chelating agents or phenolic hydroxyl-containing compounds include as examples, but are not limited to, chelatometric titration reagents such as acetylacetone, benzoyltrifluoroacetone, dipivaloylmethane, furoyltrifluoroacetone, heptafluorobutanoylpivaloylmethane, hexafluoroacetylacetone, pivaloyltrifluoroacetone, trifluoroacetylacetone, trioctylphosphine oxide and thienoyltrifluoroacetone; metal indicators such as azomethine H, bathocuproine, bathophenanthroline, 4,4'-bisdimethylaminodiphenylamine, bismuthiol II, N-benzoyl-N-phenylhydroxylamine, dibromopyrogallolsulfonephthalein, calcichrome, calmagite, chloranilic acid, chlorohydroxyphenylazonaphthol, chlorophosphonazo III, chromotropic acid, 2,3-diaminonaphthalene, 4,6-dibutyl-3-methoxycatechol, diantipyrylmethane, o,o-dihydroxyazobenzene, dimethylsulfonazo III, 2,2'-dipyridyl, 2-furildioxime, 2,2-dibenzoxazoline, lumogallion, murexide, neocuproine, neothorin, nitroferroin, nitrophenylazo-15-crown-5, nitrosoaminophenol, pyridylazonaphthol, pyridylazoresorcinol, 5,6-diphenyl-3-(2-pyridyl)-1,2,4-triazine, o-phenanthroline, porphyrin, 5,10,15,20-tetraphenyl-21H,23H-porphin, phenyl 2-pyridyl ketoxime, pyrogallolsulfonephthalein, pyrocatecholsulfonephthalein, N,N'-bissalicylidene-2,3-diaminobenzofuran, salicylaldehyde 2-hydroxyanil, salicylideneamino-2-thiophenol, stilbazo, 1,1,1-trifluoro-4-mercapto-4-(2-thienyl)-3-buten-2-one, sulfarsazen, sulfochlorophenol S, sulfonazo III, 4-methyl-2-(2-thiazolylazo) phenol, 5-dimethylamino-2-(2-thiazolylazo)phenol, 1-(2-thiazolylazo)-2-naphthol, 4-(2-thiazolylazo)resorcinol, 3'-nitro-4'-(2,4,6-trinitrophenylamino)benzo-18-crown-6, tetramethylmurexide, 4'-(2,6-dinitro-4-trifluoromethylphenyl)aminobenzo-15-crown-5,4'-(2,4-dinitro-6-trifluoromethylphenyl)aminobenzo-15-crown-5, thiooxine, thorin, tiron, 2,4,6-tris(2-pyridyl)-1,3,5-triazine, umbelliferone, variamine blue B, xylylazo violet-I and xylylazo violet-II; polyhydric alcohol compounds such as 1,3-dihydoxyacetone, ethylene glycol, glycerol, gluconodeltalactone, erythritol, xylitol, xylose and sorbitol; phenolic compounds such as phenol, p-phenolsulfonic acid, phenoxyphenol, phenylphenol, m-hydroxybenzaldehyde, p-hydroxybenzaldehyde, acetylaldehyde, 2-hydroxypropiophenone, 4-hydroxypropiophenone, p-hydroxyphenethyl alcohol, methyl p-hydroxyphenylacetate, p-hydroxyphenylacetamide, bisphenol A, bis(4-hydroxyphenyl)sulfone, hydroquinone, nonylphenol, o-nitrophenol, p-nitrophenol, 2,4-dinitrophenol, trinitrophenol, 2,3,5-trimethylhydroquinone, 2,3,4-trihydroxybenzophenone, 2,4,6-tris (dimethylaminomethyl)phenol, 2,4,6-trichlorophenol, p-dodecylphenol, 2,6-di-tert-butylphenol, 2,4-di-tert-butylphenol, 1,4-dihydroxyanthraquinone, o-cresol-4-sulfonicacid, cresol, p-(α-cumyl)phenol, guethol, guaiacol, xylenol, catechol, p-octylphenol, methyl p-hydroxybenzoate, p-ethylphenol, aminophenol, 2-amino-4-chlorophenol, 4-tert-butylcatechol, 2-tert-butylhydroquinone, p-tert-butylphenol, phloroglucinol, heptylparaben, 2-methyl-6-tert-butylphenol, metol, p-(methoxyethyl)phenol, lauryl gallate, resorcinol, leuco-1, 4-dihydroxyanthraquinone, amidol, paraaminophenol, atomal, 4-hydroxybenzonitrile and tribenzylphenol; naphthol compounds such as α-naphthol, β-naphthol, 1,4-dihydroxynaphthalene and 1,1'-bi-2-naphthol, and aromatic heterocyclic compounds such as 8-quinolinol; high-molecular compounds derived from polystyrene by partial hydroxyl introduction; and the like. These may be used singly or a plurality thereof may be used in combination.

More preferred as the metal-coordinating compounds usable in the practice of the invention for the reasons that the hydrosilylation yield in the hydrosilylation reaction is very high and that side reactions involving the hydroxyl group or crosslinkable silyl group are almost completely inhibited are carboxyl-containing compounds such as salicylic acid, p-hydroxybenzoic acid, monoethyl succinate, trichloroacetic acid, lactic acid and malic acid, succinic anhydride, acetylacetone, benzoyltrifluoroacetone, dipivaloylmethane, furoyltrifluoroacetone, hexafluoroacetylacetone, hexafluorobutanoylpivaloylmethane, pivaloyltrifluoroacetone, trifluoroacetylacetone, thienoyltrifluoroacetone, catechol, 8-quinolinol, dinitrophenol and trinitrophenol. Among them, amino-free carboxyl-containing compounds, succinic anhydride, nitrophenol, dinitrophenol and trinitrophenol are preferred and compounds having both a carboxyl group and a hydroxyl group, such as salicylic acid, p-hydroxybenzoic acid, lactic acid and malic acid are particularly preferred because of their particularly high effects. These metal-coordinating compounds may be used singly or a plurality thereof may be used in combination.

The metal-coordinating compounds usable in the practice of the invention are used generally at an addition amount of 0.00001 to 1 part by weight, preferably 0.0001 to 0.1 part by weight, more preferably 0.001 to 0.05 part by weight, per 100 parts by weight of the polyoxyalkylene polymer having at least one unsaturated group and at least one alcoholic hydroxyl group, although the effect of addition thereof varies, depending on the content of the double metal cyanide complex in the polyoxyalkylene polymer having at least one unsaturated group and at least one alcoholic hydroxyl group in each molecule, hence the addition amount is not particularly restricted. At an excessively low addition amount, the inhibition of the hydrosilylation reaction by the double metal cyanide complex cannot be suppressed to a satisfactory extent but a low hydrosilylation yield may result in some instances or, in other instances, side reactions other than the hydrosilylation reaction cannot be suppressed to a satisfactory extent. At an excessively high addition amount, side reactions may occur, impairing such physical properties as heat resistance, weathering resistance and storage stability of the resulting crosslinkable silyl group-containing polyoxyalkylene polymer, or the hydrosilylation reaction may be inhibited, or discoloration and/or precipitation may result.

In the practice of the invention, the metal-coordinating compounds may be used singly or a plurality thereof may be used in combination.

When carboxylic acids or carboxylic acid derivatives are used as the metal-coordinating compound, the polyoxyalkylene polymer having at least one crosslinkable silyl group and at least one hydroxyl group in each molecule as obtained by the hydrosilylation reaction may show somewhat decreased stability in some cases. This is supposedly due to the functioning of the carboxylic acids as catalysts to cause occurrence of such reactions as mutual condensation of crosslinkable silyl groups, condensation of a crosslinkable silyl group with a hydroxyl group, transesterification between a crosslinkable silyl group and a carboxyl group and condensation of a hydroxyl group with a carboxyl group. Therefore, from the long-term product polymer storage stability viewpoint, metal-coordinating compounds free of any carboxyl group or free of any group capable of generating a carboxyl group in the reaction system are preferred.

The method of addition of the metal-coordinating compound to the polyoxyalkylene polymer having at least one unsaturated group and at least one alcoholic hydroxyl group in each molecule is not particularly restricted. The compound may be added as it is or in the form of a solution in a solvent. When it is a solid, it may be added in a molten state resulting from heating to a temperature above the melting point thereof, or it may be added in a solid form and then dissolved in the polyoxyalkylene polymer by heating.

It is preferable to heat the polyoxyalkylene polymer having at least one unsaturated group and at least one alcoholic hydroxyl group in each molecule after addition of the metal-coordinating compound but prior to the hydrosilylation reaction using a compound having a hydrogen-silicon bond and a crosslinkable silyl group in each molecule. In the case of heating, the heating is generally carried out at a temperature not lower than 50° C., preferably 50 to 200° C., more preferably 70 to 150° C. At a heating temperature below 50° C., the inhibition of the hydrosilylation reaction by the double metal cyanide complex may not be suppressed to a satisfactory extent in some cases. At above 200° C., the polyoxyalkylene polymer having at least one unsaturated group and at least one alcoholic hydroxyl group in each molecule may undergo thermal deterioration in certain instances. The heating time is preferably 10 minutes to 5 hours, more preferably 20 minutes to 2 hours.

The compound having a hydrogen-silicon bond and a crosslinkable silyl group in each molecule, which is to be used in the practice of the invention, is not particularly restricted but those compounds represented by the general formula (3) shown below are preferred from the availability and reactivity viewpoint:

$$H—(Si(R^1_{2-b})(X_b)O)_m Si(R^2_{3-a})X_a \quad (3)$$

In the above formula, $R^1$ and $R^2$ are the same or different and each represents an alkyl group containing 1 to 20 carbon atoms, an aryl group containing 6 to 20 carbon atoms or an aralkyl group containing 7 to 20 carbon atoms or a triorganosiloxy group represented by $R^3_3SiO$— and, when there are a plurality of $R^1$ or $R^2$ groups, they may be the same or different; $R^3$ is a univalent hydrocarbon group containing 1 to 20 carbon atoms and the three $R^3$ groups may be the same or different with one another; X represents a hydroxyl group or a hydrolyzable group and, when there are two or more X groups, they may be the same or different with each other or one another; a represents 0, 1, 2 or 3 and b represents 0, 1 or 2; b's in the m of —$Si(R^1_{2-b})(X_b)O$— groups may be the same or different with each other or one another; and m represents an integer from 0 to 19 provided that the relation $a+\Sigma b \geq 1$ should be satisfied.

The hydrolyzable group represented by X is not particularly restricted but may be any of those hydrolyzable groups known in the art, for example halogen atoms and alkoxy, acyloxy, ketoximato, amino, amido, acid amide, aminoxy, mercapto and alkenyloxy groups. Among them, alkoxy groups such as methoxy, ethoxy, propoxy and isopropoxy are preferred in view of their mild hydrolyzability and the ease of handling. One to three such hydrolyzable groups may be bonded to one silicon atom and the sum $(a+\Sigma b)$ is preferably 1 to 5. When there are two or more hydrolyzable groups, they may be the same or different with each other or one another. The number of silicon atoms in the crosslinkable silyl group is not particularly restricted but is preferably about 1 to 30.

Preferred as examples of the compound represented by the above general formula (3) because of their availability are compounds represented by the general formula (4):

$$H—Si(R^4_{3-c})X_c \quad (4)$$

wherein $R^4$ represents an alkyl containing 1 to 20 carbon atoms, an aryl group containing 6 to 20 carbon atoms or an aralkyl group containing 7 to 20 carbon atoms or a triorganosiloxy group represented by $R^3_3SiO$— and, when there are a plurality of $R^4$ groups, they may be the same or different; $R^3$ is a univalent hydrocarbon group containing 1 to 20 carbon atoms and the three $R^3$ groups may be the same or different with one another; X represents a hydroxyl group or a hydrolyzable group and, when there are two or more X groups, they may be the same or different with each other or one another; and c represents 1, 2 or 3.

As specific examples of the compound having a hydrogen-silicon bond and a crosslinkable silyl group in each molecule, there may be mentioned halosilanes such as trichlorosilane, methyldichlorosilane, dimethylchlorosilane, phenyldichlorosilane, trimethylsiloxymethylchlorosilane and 1,1,3,3-tetramethyl-1-bromodisiloxane; alkoxysilanes such as trimethoxysilane, triethoxysilane, methyldiethoxysilane, methyldimethoxysilane, phenyldimethoxysilane, trimethylsiloxymethylmethoxysilane and trimethylsiloxydiethoxysilane; acyloxysilanes such as methyldiacetoxysilane, phenyldiacetoxysilane, triacetoxysilane, trimethylsiloxymethylacetoxysilane and trimethylsiloxydiacetoxysilane; ketoximatosilanes such as bis(dimethyl ketoximato)methylsilane, bis(cyclohexyl ketoximato)methylsilane, bis(diethyl ketoximato) trimethylsiloxysilane, bis(methyl ethyl ketoximato) methylsilane and tris(acetoximato)silane; alkenyloxysilanes such as methylisopropenyloxysilane; and the like. Preferred among them from the mild reactivity and ease of handling viewpoint are alkoxysilanes such as methyldimethoxysilane, trimethoxysilane, methyldiethoxysilane and triethoxysilane; and halosilanes such as trichlorosilane and methyldichlorosilane. Methyldimethoxysilane, trimethoxysilane, methyldiethoxysilane and triethoxysilane are particularly preferred since they do not produce such an hazardous substance as an acid in the step of their being hydrolyzed.

After reaction with an unsaturated group in the manner of hydrosilylation, the halogen atom(s) in the halosilanes may be converted to some other hydrolyzable group(s) by reacting with an active hydrogen-containing compound such as a carboxylic acid, oxime, amide or hydroxylamine or a ketone-derived alkali metal enolate by an appropriate method known in the art.

The addition amount of the compound having a hydrogen-silicon bond and a crosslinkable silyl group in each molecule is not particularly restricted but generally is such that the hydrogen-silicon bond amounts to 0.3 to 3 moles, preferably 0.5 to 2 moles, more preferably 0.6 to 1.5 moles, per mole of the unsaturated group in the polyoxyalkylene polymer having at least one unsaturated group and at least one alcoholic hydroxyl group. When the amount is below 0.3 mole, the final cured product may not show sufficient rubber-like physical properties while an amount exceeding 3 moles may entail an economical disadvantage in some instances. The excess of the compound having a hydrogen-silicon bond and across linkable silyl group in each molecule may be removed after completion of the reaction by distilling off the volatile matter under reduced pressure. The compound having a hydrogen-silicon bond and a crosslinkable silyl group in each molecule may be used singly or a combination of a plurality of species may be used.

The hydrosilylation catalyst to be used in the practice of the invention is not particularly restricted but may be any of those metal complexes the metal of which is selected from among the group VIII transition metals such as platinum, rhodium, cobalt, palladium and nickel. From the hydrosilylation reactivity viewpoint, $H_2PtCl_6 \cdot 6H_2O$, platinum-divinylsiloxane complexes, platinum-olefin complexes, Pt metal, $RhCl(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$, $TiCl_4$ and the like are preferred, $H_2PtCl_6 \cdot 6H_2O$, platinum-vinylsiloxane complexes and platinum-olefin complexes are more preferred and platinum-vinylsiloxane complexes and platinum-olefin complexes are particularly preferred. The platinum-vinylsiloxane complexes collectively refer to compounds resulting from coordination of an intramolecular vinyl-containing siloxane, polysiloxane or cyclic siloxane, as a ligand, to a platinum atom. As typical examples of the ligand, there may be mentioned 1,1,3,3-tetramethyl-1,3-divinylsiloxane and the like. As specific examples of the olefin ligand in the platinum-olefin complex, there may be mentioned 1,5-hexadiene, 1,7-octadiene, 1,9-decadiene, 1,11-dodecadiene and 1,5-cyclooctadiene. Among the ligands specifically mentioned above, 1,1,3,3-tetramethyl-1,3-divinylsiloxane and 1,9-decadiene are preferred from the hydrosilylation reactivity viewpoint. The hydrosilylation catalyst to be used in the practice of the invention may be used singly or a combination of a plurality of species may be used.

The amount of the hydrosilylation catalyst to be used is not particularly restricted but generally is 0.00001 to 1 part by weight, preferably 0.00005 to 0.05 part by weight, more preferably 0.0001 to 0.01 part by weight, based on the weight of the metal in the catalyst, per 100 parts by weight of the polyoxyalkylene polymer having at least one unsaturated group and at least one alcoholic hydroxyl group in each molecule. When the amount is less than 0.00001 part by weight, any sufficient reaction activity may not be obtained in some instances and an amount exceeding 1 part by weight may be economically disadvantageous or cause discoloration of the polymer in certain instances.

The platinum-vinylsiloxane complexes and platinum-olefin complexes are disclosed in Japanese Kokoku Publication Hei-08-9006, for instance.

In the above reaction, the use of a solvent is essentially unnecessary. For uniformly dissolving the catalyst and/or substrate, for controlling the reaction system temperature and/or for facilitating the addition of the substrate and/or catalyst components, however, a solvent can be used. Solvents suited for these purposes include, but are not limited to, hydrocarbon compounds such as hexane, cyclohexane, ethylcyclohexane, heptane, octane, dodecane, benzene, toluene, xylene and dodecylbenzene; haogenated hydrocarbon compounds such as chloroform, methylene chloride, chlorobenzene and o-dichlorobenzene; and ethers such as ethyl ether, tetrahydrofuran and ethylene glycoldimethyl ether, among others. Those plasticizers which can be used as plasticizers for the polyoxyalkylene polymer, such as phthalate esters and polyethers, can also be used as the reaction solvents. These may be used singly or a plurality of them may be used in combination.

The hydrosilylation reaction temperature is not particularly restricted but preferably is within the range of 0° C. to 150° C., more preferably 20° C. to 120° C. At below 0° C., the rate of reaction may be low in some instances and, at above 150° C., side reactions involving the hydroxyl group, hydrogen-silicon bond and/or crosslinkable silyl group may proceed in certain instances.

In accordance with the invention, a hydrosilylation yield of not less than 50%, on the unsaturated group basis, can be attained and, further, the residual hydroxyl percentage after hydrosilylation can amount to not less than 80% of the hydroxyl group content before hydrosilylation. Both percentages are determined on the base of $^1$H-NMR.

The polyoxyalkylene polymer having at least one crosslinkable silyl group and at least one hydroxyl group in each molecule as produced by the above reaction can react with water or atmospheric moisture to give crosslinked cured products and therefore is useful as a raw material or raw material intermediate for sealing, adhesive, coating and like materials or compositions for architectural or industrial use. The high remaining hydroxyl group percentage of this polyoxyalkylene polymer having at least one crosslinkable silyl group and at least one hydroxyl group in each molecule is favorable for the functional group introduction thereinto by urethane bond formation or esterification, for instance, or for the coupling thereof. Further, when a metal-coordinating compound used has neither carboxyl group nor group capable of generating a carboxyl group in the reaction system, the polymer obtained is superior in long-term storage stability.

Step (b)

In subjecting the polyoxyalkylene polymer containing at least one crosslinkable silyl group and at least one hydroxyl group to coupling reaction utilizing the hydroxyl group thereof in accordance with the invention, a coupling agent is used. The coupling agent to be utilized is not particularly restricted provided that it has two or more functional groups capable of reacting with the hydroxyl group but includes, among others, polyisocyanate compounds, polybasic carboxylic acid compounds, polybasic carboxylic acid anhydrides and polybasic carboxylic acid derivatives. Further, compounds having only one functional group but capable of reacting with and binding to two or more hydroxyl groups can also be used. Such compounds include, but are not limited to, aldehyde compounds and carbonate compounds, for instance.

For the cured products to acquire satisfactory physical characteristics, it is preferred that the yield of the coupling reaction which utilizes the hydroxyl group is as high as possible. In accordance with the present invention, a yield of not less than 80% is preferably for the coupling reaction, more preferably not less than 85%, based on the area ratio of the values as obtained from the gel permeation chromatography analysis. Here, the following formula is used in the calculation method of obtaining the yield of the coupling reaction from the gel permeation chromatography analysis: $(1-X) \times 100$ (%), where X is the ratio of the peak area showing the uncoupled polymer relative to the peak area showing total polymer.

Among the coupling agents usable in the practice of the invention, the polyisocyanate compounds, namely compounds having two or more isocyanato groups in each molecule, include, but are not limited to, diisocyanate compounds such as hexamethylene diisocyanate, 2,4-tolylene diisocyanate, diphenylmethanediisocyanate, isophoronediisocyanate, xylylene diisocyanate, methylenebis(cyclohexyl isocyanate), bis(isocyanatomethyl)cyclohexane, 1,5-naphthylene diisocyanate, ethylene diisocyanate, methylene diisocyanate, propylene diisocyanate and tetramethylene diisocyanate; triisocyanate compounds such as 1,6,11-undecanetriisocyanate and triphenylmethanetriisocyanate; polyisocyanate compounds obtained by reacting the compounds mentioned above with a polyhydric alcohol compound; isocyanurate modifications of the compounds mentioned above; polyisocyanate compounds obtained by reacting the compounds mentioned above with a polyamine; and so forth.

Among the coupling agents usable in the practice of the invention, the polybasic carboxylic acid compounds include, but are not limited to, adipic acid, itaconic acid, iminodiacetic acid, ethylenediaminetetraacetic acid, glutaric acid, citraconic acid, oxalic acid, tartaric acid, diparatoluoyltartaric acid, dibenzoyltartaric acid, sebacic acid, 3,3'-thiodipropionic acid, thiomaleic acid, dodecanedioic acid, 1,2-cyclohexanediaminetetraacetic acid, brasilic acid, malonic acid, isophthalic acid, terephthalic acid, naphthalenedicarboxylic acid, 5-hydroxyisophthalic acid, 1-cyanoethyl-2-methylimidazole trimellitate, 1-cyanoethyl-2-phenylimidazole trimellitate, 1-cyanoethyl-2-ethyl-4-methylimidazole trimellitate, 1-cyanoethyl-2-undecylimidazole trimellitate, imidazole-4,5-dicarboxylic acid, chelidamic acid, 2,3-pyrazinedicarboxylic acid, folic acid, citric acid, succinic acid, fumaric acid, malic acid, glutamic acid, aspartic acid and cystine, among others.

Among the coupling agents usable in the practice of the invention, the polybasic carboxylic acid anhydrides include, but are not limited to, itaconic anhydride, citraconic anhydride, maleic anhydride, 3,3',4,4'-benzophenonetetracarboxylic acid dianhydride, trimellitic anhydride, pyromellitic anhydride, phthalic anhydride, maleated methylcyclohexene tetrabasic acid anhydride, endomethylenetetrahydrophthalic anhydride, chlorendic anhydride, methylendomethylenetetrahydrophthalic anhydride and methyltetrahydrophthalic anhydride, among others.

Among the coupling agents usable in the practice of the invention, the polybasic carboxylic acid derivatives include, but are not limited to, diethyl ethoxymethylenemalonate, diethyl succinate, diethyl oxalate, fumaroyl chloride, diallyl hexahydrophthalate, diethyl malonate, diallyl isophthalate, dimethyl isophthalate, dimethyl terephthalate, diallyl terephthalate, triallyl trimellitate, dimethyl naphthalenedicarboxylate, bis(2-hydroxyethyl) terephthalate, o-phthaloyl chloride, diallyl phthalate, butylphthalyl butyl glycolate, dimethyl phthalate, diethyl phthalate, dibutyl phthalate, diheptyl phthalate, di-2-ethylhexyl phthalate, butyl benzyl phthalate, dicyclohexyl phthalate, dioctyl adipate, diisononyl adipate, bis(2-ethylhexyl)azelate, dibutyl sebacate, triethyl acetylcitrate, dibutyl maleate, dibutyl fumarate, dilauryl 3,3'-thiodipropionate, ethylene dodecanedioate, ethylene brasilate, aspartame, succinyl dichloride, oxalyl dichloride, o-phthaloyl dichloride and adipoyl dichloride, among others.

Among the coupling agents usable in the practice of the invention, the aldehyde compounds include, but are not limited to, acrolein, acetaldehyde, octylaldehyde, glyoxal, glyoxylic acid, crotonaldehyde, butyraldehyde, formaldehyde, methacrolein, methylglyoxal, p-aminobenzaldehyde, 3,4,5-trimethoxybenzaldehyde, hydroxybenzaldehyde, benzaldehyde, 3-aldehydopyridine, furfural, chlorobenzaldehyde, dichlorobenzaldehyde, monochloroacetaldehyde, trifluoromethylbenzaldehyde, anisaldehyde, amylcinnamic aldehyde, undecylenic aldehyde, cuminaldehyde, cinnamaldehyde, cyclamen aldehyde, 3,4-dimethoxybenzaldehyde, decylaldehyde, vanillin, hydoxycitronellal, phenylacetaldehyde, heliotropin and p-methylphenylacetaldehyde, among others.

Among the coupling agents usable in the practice of the invention, the carbonate compounds include, but are not limited to, ethylene carbonate, diethyleneglycolbis(allyl carbonate), di-tert-butyl carbonate, dimethyl carbonate, propylene carbonate, diethyl carbonate, diallyl carbonate, allyl ethyl carbonate and diphenyl carbonate, among others.

Preferred as the coupling agent which can be used when the polyoxyalkylene polymer containing at least one crosslinkable silyl group and at least one hydroxyl group is subjected to coupling reaction utilizing the hydroxyl group thereof are compounds having two or more isocyanate groups in each molecule for the reasons that they do not cause formation of such byproducts as acids, water or alcohols, that it is not necessary to use a catalyst which might promote the condensation of the crosslinkable silyl group and that they are readily available. More preferred from the good weathering resistance viewpoint are aliphatic polyisocyanate compounds, in particular aliphatic diisocyanates and/or aliphatic triisocyanates, such as hexamethylene diisocyanate, isophorone diisocyanate, methylenebis (cyclohexyl isocyanate) and the polyisocyanate compound obtained by reacting trimethylolpropane with hexamethylene diisocyanate.

In the practice of the invention, the coupling agent is used preferably in an amount of 0.5 to 3 moles, more preferably 0.8 to 2 moles, most preferably 0.95 to 1.5 moles, as expressed in terms of such a functional group as an isocyanate or carboxyl group, per mole of the hydroxyl group in the polyoxyalkylene polymer containing at least one crosslinkable silyl group and at least one hydroxyl group. When the amount is less than 0.5 mole, the coupling yield is insufficient and the crosslinkable silyl group-containing polyoxyalkylene polymer obtained may provide unsatisfactory physical properties in some cases. An amount exceeding 3 moles may be uneconomical in certain instances.

Those coupling agents which can be used in the practice of the invention may be used singly or a plurality thereof may be used in combination.

When a compound having two or more isocyanato groups in each molecule is used as the coupling agent, up to about 5 moles of the isocyanato group can be reacted with the hydroxyl groups in each mole of the polyoxyalkylene polymer. In such a case, it is possible to effect the coupling by reacting a compound having two or more active hydrogen atoms in each molecule with the excess isocyanate group. Thus, the polyoxyalkylene polymer having at least one crosslinkable silyl group and at least one hydroxyl group in each molecule is reacted with a compound having two or more isocyanato groups in each molecule in relative amounts such that the isocyanato group is excess relative to the hydroxyl group and then the unreacted isocyanato group is reacted with a compound having two or more active hydrogen atoms in each molecule, whereby the coupling reaction can be effected.

Such compound having two or more active hydrogen atoms in each molecule includes, but is not limited to, compounds having, in each molecule, two or more groups selected from the group consisting of hydroxyl, mercapto, carboxyl and nitrogen-bound hydrogen-containing amino groups.

Such compounds include, but are not limited to, polyhydric alcohols such as 3,6-dimethyl-4-octyne-3,6-diol, 2,4,7,9-tetramethyl-5-decyne-4,7-diol, 2,5-dimethyl-3-hexyne-2,5-diol, 2,5-dimethyl-3-hexane-2,5-diol, N-methyldiethanolamine, triisopropanolamine, triethanolamine, ethylene glycol, diethylene glycol, triethylene glycol, octanediol, sorbitol polyglycidyl ether, gluconic acid, glycerol α-monochlorohydrin, 1,4-cyclohexanediol, 1,3-dihydroxyacetone, disodium 1,4-dihydroxy-1,4-butanedisulfonate, diisopropyl tartrate, thiodiglycol, trimethylolethane, trimethylolpropane, neopentyl glycol, butanediol, 2-butyl-2-ethyl-1,3-propanediol, propylene glycol, dipropylene glycol, tripropylene glycol, 1,6-hexanediol, 1,2,6-hexanetriol, hexylene glycol, pentaerythritol, 1,5-pentanediol, polyethylene glycol, polytetramethylene ether glycol, polypropylene glycol, 3-methyl-1,5-pentanediol, catechol, 1,4-dihydroxyanthraquinone, 1,4-dihydroxynaphthalene, hydrogenated bisphenol A, 2,3,4-trihydroxybenzophenone, 2,3,5-trimethylhydroquinone, hydroquinone, bis(2-hydroxyethyl) terephthalate, bis(4-hydroxyphenyl)sulfone, bisphenol A, p-hydroxyphenethyl alcohol, 4-tert-butylcatechol, 2-tert-butylhydroquinone, protocatechuic acid, phloroglucinol, gallic acid, lauryl gallate, resorcinol, leuco-1,4-dihydroxyanthraquinone, 1,1'-bi-2-naphthol, 2-phenyl-4,5-bis(hydroxymethyl)imidazole, kojic acid, citrazinic acid, spiroglycol, tris(2-hydroxyethyl)isocyanurate, 5-fluorouracil, 2-(2-hydroxyethoxy)ethyl 2-hydroxypropyl tetrabromophthalate, 2,2-bis(4-hydroxyphenyl) hexafluoropropane, polysiloxanes hydroxyl-terminated at both termini, polyparavinylphenol, polyvinyl alcohol, β-1,4-glucose, 2,2'-methylenebis(4-methyl-6-tert-butylphenol), 4,4'-thiobis(3-methyl-6-tert-butylphenol), poly(oxyethylene)alkylamines, poly(oxyethylene)alkylamides, sorbitan fatty acid esters, erysorbic acid, nordihydroguaiaretic acid, propyl gallate, riboflavin, pyridoxine, pantothenicacid, ascorbicacid, glycerophosphate, gluconic acid, gluconodeltalactone, erythritol, xylitol, xylose, sorbitol, inosine and arabinosylcytosine; polythiol compounds such as trimethylolpropane tris(thioglycolate), triglycol dimercaptan, pentaerythritol tetrakisthioglycolate, pentaerythritol tetrakisthiopropionate, trimethylolpropane tris(β-thiopropionate) and 2,5-dimercapto-1,3,4-thiadiazole; polybasic carboxylic acid compounds such as adipic acid, azobiscyanovaleric acid, itaconic acid, imidiacetic acid, ethylenediaminetetraacetic acid, glutaric acid, succinic acid, citraconic acid, oxalic acid, tartaric acid, diparatoluoyltartaric acid, dibenzoyltartaric acid, sebacic acid, 3,3'-thiodipropionic acid, thiomaleic acid, dodecanedioic acid, trans-1,2-cyclohexanediaminetetraacetic acid, brasilic acid, hexahydrophthalic acid, polyacrylic acid, poly(4-hydroxybutyl acrylate), poly(2-hydroxyethyl acrylate), poly(2-hydroxypropyl acrylate), poly(2-hydroxyethyl methacrylate), poly(2-hydroxypropyl methacrylate), malonic acid, isophthalic acid, terephthalic acid, 1,4-naphthalenedicarboxylic acid, 2,6-naphthalenedicarboxylic acid, 5-hydroxyisophthalic acid, trimellitic acid, pyromellitic acid, phthalic acid, 1-cyanoethyl-2-methylimidazole trimellitate, 1-cyanoethyl-2-phenylimidazole trimellitate, 1-cyanoethyl-2-ethyl-4-methylimidazole trimellitate, imidazole-4,5-dicarboxylic acid, chelidamic acid, 2,3-pyrazinedicarboxylic acid, chlorendic acid, folic acid, aspartic acid, glutamic acid, citric acid, fumaric acid, malic acid and glycyrrhetic acid; polyamine compounds such as adipic dihydrazide, primary amine-modified acrylic polymers, 3,3'-iminobis(propylamine), 3-(methylamino)propylamine, N-methyl-3,3'-iminobis(propylamine), ethylenediamine, diethylenetriamine, triethylenetetramine, tetraethylenepentamine, pentaethylenehexamine, carbohydrazide, guanidine, guanylthiourea, 1,4-diaminobutane, diaminopropane, diaminomaleonitrile, dicyandiamide, 3,9-bis(3-aminopropyl)-2,4,8,10-tetraoxaspiro[5.5]undecane, thiocarbohydrazide, thiosemicarbazide, thiourea, dodecanedioicdihydrazide, hexamethylenediamine, formamidine, m-xylylenediamine, dianisidine, 4,4'-diaminostilbene-2,2'-disulfonic acid, 1,4-diamnoanthraquinone, 4,4'-diamino-3,3'-diethyldiphenylmethane, 4,4'-diaminobenzanilide, diaminodiphenyl ether, 3,3'-dimethyl-4,4'-diaminodiphenylmethane, tolidine base, m-toluylenediamine, phenylenediamine, amidol, paramine, acetoguanamine, 1-(2-aminoethyl) piperazine, 2,4-diamino-6-(2-methyl-1-imidazolyl)-ethyl-1,3,5-triazine, 1,3-bis(hydrazinocarboethyl)-5-isopropylhydantoin, piperazine, benzoguanamine, melamine, 3,3'-dichloro-4,4'-diaminodiphenylmethane, 3,3'-dichloro-4,4'-diaminobiphenyl, aminopolyacrylamide, polyallylamine and bisbentiamine; compounds having different kinds of active hydrogen, such as N-(2-aminoethyl) ethanolamine, N-methylethanolamine, 12-aminododecanoic acid, 3-amino-1-propanol, monoisopropanolamine, diisopropanolamine, monoethanolamine, diethanolamine, N-carboxy-4,4'-methylenebiscyclohexylamine, glyoxylic acid, glycylglycine, cysteamine, thioglycolic acid, 1-thioglycerol, lactic acid, α-hydroxyisobutyric acid, 2-hydroxyethylaminopropylamine, formamidoxime, 2-mercaptoethanol, β-mercaptopropionic acid, p-aminobenzoic acid, 2-amino-4-chlorophenol, 2-aminothiophenol, aminophenol, anthranilic acid, β-hydroxynaphthoic acid, salicylic acid, 2-amino-5-naphthol-7-sulfonic acid, thiosalicylic acid, p-hydroxybenzoic acid, 6-hydroxy-2-naphthoic acid, p-hydroxyphenylacetic acid, p-hydroxyphenylacetamide, p-hydroxyphenylpropionic acid, benzilic acid, mandelic acid, leuco-1,4-diaminoanthraquinone, p-hydroxyphenylglycine, 3-carbamoylpyrazinecarboxylic acid, (hydroxyethyl)piperazine, 2-amino-4-chlorobenzoic acid, isoleucine, threonine, tryptophan, valine, histidine, phenylalanine, methionine, lysine, aspartame, alanine, glycine and theanine; water; ammonia; and so forth.

These may be used singly or a plurality thereof may be used in combination.

Among these, hydroxyl-containing compounds and amino-containing compounds are preferred from the reactivity viewpoint and compounds having three or more hydroxyl groups or amino groups in each molecule, such as trimethylolpropane, trimethylolethane, pentaerythritol, 1,2,6-hexanetriol and melamine, are more preferred since product polymers showing increased strength can be obtained with them.

It is also possible to subject the excess isocyanato group to coupling by the isocyanurate ring formation reaction.

When, in the practice of the invention, the polyoxyalkylene polymer having at least one crosslinkable silyl group and at least one hydroxyl group in each molecule is reacted with a coupling agent such as a compound having two or more isocyanato groups in each molecule, it is not always necessary to use a catalyst. For increasing the rate of reaction or improving the degree of conversion, however, a catalyst may be used. The catalyst to be used in carrying out the coupling reaction using a polyisocyanate compound includes, but is not limited to, those catalysts mentioned in Polyurethanes: Chemistry and Technology, Part I, Table 30, Chapter 4, Saunders and Frisch, Interscience Publishers, New York, 1963, for instance.

Preferred as the urethane formation reaction catalysts usable in effecting the coupling reaction using a polyisocyanate compound because of their high activity are tin catalysts such as stannous octylate, stannous stearate, dibutyltin dioctoate, dibutyltin dioleylmaleate, dibutyltin dibutylmaleate, dibutyltin dilaurate, 1,1,3,3-tetrabutyl-1,3-dilauryloxycarbonyldistannoxane, dibutyltin diacetate, dibutyltin diacetylacetonate, dibutyltin bis(o-phenylphenoxide), dibutyltin oxide, dibutyltin bis (triethoxysilicate), dibutyltin distearate, dibutyltin bis (isononyl 3-mercaptopropionate), dibutyltinbis(isooctyl thioglycolate), dioctyltin oxide, dioctyltin dilaurate, dioctyltin diacetate and dioctyltin diversatate. Further, it is preferable to use catalysts low in activity against crosslinkable silyl groups and, thus, for example, sulfur atom-containing tin catalysts such as dibutyltin bis(isononyl 3-mercaptopropionate) and dibutyltin bis(isooctyl thioglycolate) are particularly preferred.

In cases where the coupling reaction is carried out using a polybasic carboxylic acid, polybasic carboxylic acid anhydride, polybasic carboxylic acid derivative, aldehyde compound, carbonate compound or the like, too, those catalysts known in the art for the respective reactions can be used.

The addition amount of such a catalyst is not particularly restricted but preferably is 0.0001 to 3 parts by weight, more preferably 0.001 to 0.5 part by weight, most preferably 0.003 to 0.1 part by weight, per 100 parts by weight of the polyoxyalkylene polymer. At an amount below 0.0001 part by weight, a sufficient reaction activity may not be obtained while, at an amount exceeding 3 parts by weight, the heat resistance, weathering resistance, hydrolysis resistance and/ or like physical properties of the crosslinkable silyl group-containing polyoxyalkylene obtained may be impaired as the case may be.

While the use of a solvent is not necessary in the above coupling reaction, a solvent may be used for uniformly dissolving the catalyst and/or substrate, or for controlling the reaction system temperature or for facilitating the addition of the catalyst components. Solvents suited for such purposes include, but are not limited to, hydrocarbon compounds such as hexane, cyclohexane, ethylcyclohexane, heptane, octane, dodecane, benzene, toluene, xylene and dodecylbenzene; halogenated hydrocarbon compounds such as chloroform, methylene chloride, chlorobenzene and o-dichlorobenzene; and ethers such as ethyl ether, tetrahydrofuran and ethylene glycol dimethyl ether, among others.

The method of the invention does not require any treatment step or any purification step either before or after the hydrosilylation reaction or either before or after the coupling reaction which utilizes the hydroxyl group. The application of some or other treatment step or purification step for a particular reason is not excluded, however.

Since the production method of the invention does not require any purification step, the series of reaction steps from the polyoxyalkylene polymer production by polymerization to the coupling reaction can be carried out in succession in one and the same reactor.

The crosslinkable silyl group-containing polyoxyalkylene polymers obtained by the production method according to the invention can give crosslinked cured products upon reaction with water or the moisture in the atmosphere and are useful as raw materials or raw material intermediates for use in sealing compositions, adhesive compositions, coating compositions and the like for architectural or industrial use.

The invention, which has the constitution mentioned above, makes it possible to expediently obtain, from a polyoxyalkylene polymer having at least one unsaturated group and at least one alcoholic hydroxyl group in each molecule, a polyoxyalkylene polymer having at least one crosslinkable silyl group and at least one hydroxyl group in each molecule or a crosslinkable silyl group-containing polyoxyalkylene polymer, without the necessity of removing the process-derived double metal cyanide complex catalyst. As a result, the relevant purification step can be omitted and the production process can be markedly simplified. The thus-obtainable polyoxyalkylene polymer containing at least one crosslinkable silyl group and at least one hydroxyl group shows a high crosslinkable silyl group introduction rate and a high remaining hydroxyl group percentage and therefore is suited for use in further functional group introduction or coupling utilizing the crosslinkable silyl group and/or hydroxyl group. The crosslinkable polyoxyalkylene polymer obtained provides satisfactory physical properties when used as a raw material in sealing compositions or adhesives compositions. In addition, the polymer can be stored stably for a long period. Furthermore, since any step of purifying the raw material is not necessary, the reactions from polymerization to coupling can be carried out continuously in a single reaction vessel.

EXAMPLES

The following examples illustrate the invention in more detail. They are, however, by no means limitative of the scope of the invention.

Production Example 1

An autoclave was charged with 0.56 g of zinc hexacyanocobaltate-glyme complex as an epoxide polymerization catalyst, 2,016 g of a polyoxypropylene polymer having an unsaturated group and a hydroxyl group in each molecule with an average molecular weight of 1,500 (Unisafe PKA-5014, product of NOF Corp., 0.676 mmol OH/g) as a polymerization initiator and 210 g of propylene oxide for catalyst activation, and the polymerization reaction was carried out by heating to 100° C. After the lapse of the induction period, the temperature of the reaction mixture rose abruptly and then dropped. After confirmation of the drop in reaction mixture temperature, additional 4,760 g of propylene oxide was added dropwise over about 5 hours and the inside temperature was maintained at 100 to 110° C. After completion of the dripping, postpolymerization was carried out for 1 hour and then an attempt was made to recover the unreacted monomer by distilling off the volatile matter under reduced pressure. Little was recovered, however. Thus was obtained a polyoxypropylene polymer having an unsaturated group and a hydroxyl group in each molecule with about 80 ppm of the double metal cyanide complex catalyst mixed therein. The polymer obtained had an unsaturated group equivalent of 0.183 mmol/g as determined by iodometry and a hydroxyl group equivalent of 0.225 mmol/g as determined by hydroxyl value titrimetry.

Examples 1 to 11 and Comparative Example 1

A 100-g portion of the polyoxypropylene polymer having an unsaturated group and a hydroxyl group in each molecule as produced in Production Example 1 (unsaturated group 18.3 mmol), with about 80 ppm of the double metal cyanide complex catalyst mixed therein, was placed in a nitrogen-sealed glass reactor without purification and, after addition of a specified amount of a carboxylic acid compound was added by a specified method of addition, as specified in Table 1 and, after 30 minutes of treatment as specified in Table 1, 9.5 μl of a solution of platinum-divinyltetramethyldisiloxane in xylene (metal content 3% by weight) and 18.5 mmol of methyldimethoxysilane were added, and the reaction was allowed to proceed at 60° C. for 2 hours. After cooling, the reaction mixture was analyzed for percent hydrosilylation and percent remaining hydroxyl group by $^1$H NMR. Specifically, percent hydrosilylation was calculated from the integral value of allyl groups before the reaction (5 to 6 ppm), that of silylmethyl groups after the reaction (0.1 ppm) and that of unreacted allyl groups after the reaction (5 to 6 ppm) (the same calculation was applied to the following examples). The percent remaining hydroxyl group was calculated from the integral value of methine moieties at the terminal hydroxyl groups (3.8 ppm) and that of methine moieties at the terminal siloxy groups (silyl groups from hydroxyl groups, 3.9 to 4.0 ppm) (the same calculation was applied to the following examples). The results are shown in Table 1.

TABLE 1

| | Metal-coordinating compound | Addition amount | Method of addition | Treatment after addition of the metal-coordinating compound | % Hydrosilylation | % Residual hydroxyl group |
|---|---|---|---|---|---|---|
| Ex. 1 | Succinic anhydride | 440 mg | Direct addition | Dissolved in the polymer by heating at 130° C. | 72% | 98% |
| Ex. 2 | Succinic anhydride | 44 mg | Direct addition | Dissolved in the polymer by heating at 130° C. | 76% | 97% |
| Ex. 3 | 2-Ethylhexanoic acid | 64 mg | Direct addition | Heating at 60° C. | 47% | 85% |
| Ex. 4 | Succinic acid | 52 mg | Methanol solution | Heating at 60° C. | 64% | 97% |
| Ex. 5 | Phthalic anhydride | 65 mg | Direct addition | Dissolved in the polymer by heating at 130° C. | 83% | 95% |
| Ex. 6 | Salicylic acid | 61 mg | Methanol solution | Heating at 60° C. | 65% | 99% |
| Ex. 7 | Stearic acid | 126 mg | Direct addition | Heating at 60° C. | 53% | 86% |
| Ex. 8 | L-Lactic acid | 40 mg | Direct addition | Heating at 60° C. | 79% | 90% |
| Ex. 9 | Malonic acid | 46 mg | Methanol solution | Heating at 60° C. | 78% | 91% |
| Ex. 10 | Ethylenediaminetetraacetic acid | 129 mg | Direct addition | Heating at 130° C.; in a suspended state | 53% | 85% |
| Ex. 11 | DL-Malic acid | 59 mg | Direct addition | Dissolved in the polymer by heating at 130° C. | 84% | 93% |
| Compar. Ex. 1 | (No addition) | | | No heating | 20% | 44% |

Production Example 2

A polyoxypropylene polymer having an unsaturated group and a hydroxyl group in each molecule with a double metal cyanide complex catalyst content of about 160 ppm was obtained in the same manner as in Production Example 1 except that the amount of the polymerization initiator and the amount of propylene oxide for catalyst activation were each reduced by half. The polymer obtained had an unsaturated group equivalent of 0.081 mmol/g as determined by iodometry and a hydroxyl group equivalent of 0.109 mmol/g as determined by hydroxyl value titrimetry.

Example 12

A 100-g portion of the polyoxypropylene polymer having an unsaturated group and a hydroxyl group in each molecule with a double metal cyanide complex catalyst content of about 160 ppm as produced in Production Example 2 (unsaturated group 8.1 mmol) was placed in a nitrogen-sealed glass reactor without purification, and 10 mg of succinic anhydride was added. The mixture was heated to 130° C. and, after confirmation of complete dissolution of the succinic anhydride, cooled to 60° C., 9.5 μl of a solution of platinum-divinyltetramethyldisiloxane in xylene (metal content 3% by weight) and 8.1 mmol of methyldimethoxysilane were added, and the reaction was allowed to proceed at 60° C. for 5 hours. After cooling, the reaction mixture was analyzed for percent hydrosilylation and percent remaining hydroxyl group by $^1$H NMR. The results are shown in Table 2.

Comparative Example 2

A 100-g portion of the polyoxypropylene polymer having an unsaturated group and a hydroxyl group in each molecule with a double metal cyanide complex catalyst content of about 160 ppm as produced in Production Example 2 (unsaturated group 8.1 mmol) was placed in a nitrogen-sealed glass reactor without purification, and 9.5 μl of a solution of platinum-divinyltetramethyldisiloxane in xylene (metal content 3% by weight) and methyldimethoxysilane (8.1 mmol) were added, and the reaction was allowed to proceed at 60° C. for 5 hours. After cooling, the reaction mixture was analyzed for percent hydrosilylation and percent remaining hydroxyl group by $^1$H NMR. The results are shown in Table 2.

Example 13

A 60-g portion of the polyoxypropylene polymer having an unsaturated group and a hydroxyl group in each molecule with a double metal cyanide complex catalyst content of about 80 ppm as produced in Production Example 1 (unsaturated group 11.0 mmol) was placed in a nitrogen-sealed glass reactor without purification, and 6.6 mg of succinic anhydride (as a 5% solution in THF) was added. Then, 18 mg of a solution of platinum-divinyltetramethyldisiloxane in xylene (metal content 0.6% by weight) and 7.7 mmol of methyldimethoxysilane were added, and the reaction was allowed to proceed at 80° C. for 4 hours. After cooling, the reaction mixture was analyzed for percent hydrosilylation and percent remaining hydroxyl group by $^1$H NMR. The results are shown in Table 2.

Example 14

A 60-g portion of the polyoxypropylene polymer having an unsaturated group and a hydroxyl group in each molecule with a double metal cyanide complex catalyst content of about 80 ppm as produced in Production Example 1 (unsaturated group 11.0 mmol) was placed in a nitrogen-sealed glass reactor without purification, 6.6 mg of succinic anhydride (as a 5% solution in THF) was added, and the mixture was heated at 100° C. with stirring for 1 hour. After cooling to 60° C., 18 mg of a solution of platinum-divinyltetramethyldisiloxane in xylene (metal content 0.6% by weight) and 7.7 mmol of methyldimethoxysilane were added, and the reaction was allowed to proceed at 80° C. for 4 hours. After cooling, the reaction mixture was analyzed for percent hydrosilylation and percent remaining hydroxyl group by $^1$H NMR. The results are shown in Table 2.

Production Example 3

An autoclave was charged with 0.56 g of zinc hexacyanocobaltate-glyme complex as an epoxide polymerization catalyst, 2,016 g of a polyoxypropylene having an allyl group and a hydroxyl group in each molecule with a number average molecular weight of 1,500 (Unisafe PKA-5014, product of NOF, 0.676 mmol OH/g) as a polymerization initiator and 256 g of propylene oxide, and the polymerization reaction was carried out by heating to 100° C. After the lapse of the induction period, the temperature of the reaction mixture once rose and then dropped. After confirmation of the drop in reaction mixture temperature, additional 4,760 g of propylene oxide was added dropwise over about 5 hours and the inside temperature was maintained at 100 to 110° C. After completion of the dropping, the heating was further continued for 1 hour and then an attempt was made to recover the unreacted monomer by distilling off the volatile matter under reduced pressure. Little was recovered, however. Thus was obtained a polyoxypropylene polymer having an allyl group and a hydroxyl group in each molecule with about 80 ppm of the zinc hexacyanocobaltate-glyme complex mixed therein. The polymer obtained had an allyl group equivalent of 0.183 mmol/g as determined by iodometry and a hydroxyl group equivalent of 0.225 mmol/g as determined by hydroxyl value titrimetry. The metal concentrations in the polymer were calculated based on the amount of the zinc hexacyanocobaltate-glyme complex used at $3.2 \times 10^{-4}$ mmol/g for Zn and $1.6 \times 10^{-4}$ mmol/g for Co.

Examples 15 to 22 and Comparative Example 3

A 100-g portion of the polyoxypropylene having an allyl group and a hydroxyl group in each molecule as produced in Production Example 3 (unpurified; allyl group 18.3 mmol), with about 80 ppm of the zinc hexacyanobobaltate-glyme complex mixed therein, was placed in a glass reactor and, after azeotropic distillation with toluene for water removal, a specified amount of a carboxyl-free coordinating compound shown in Table 2 was added and, after determined treatment, 40 μl of a solution of platinum-divinyltetramethyldisiloxane complex in xylene (platinum metal content 3% by weight) and 14.6 mmol of methyldimethoxysilane were added at 60° C., and the reaction was allowed to proceed for 2 hours. After cooling, the reaction mixture was analyzed for percent hydrosilylation and percent remaining hydroxyl group by $^1$H NMR. The results are shown in Table 2. Comparative Example 3 is an example in which the hydrosilylation reaction was carried out without adding any coordinating compound.

TABLE 2

|  | Metal-coordinating compound | Addition amount (ppm) | Equivalents (eq./Zn) | Treatment after addition of the metal-coordinating compound | % Hydrosilylation | % Residual hydroxyl group |
|---|---|---|---|---|---|---|
| Ex. 12 | Acetylacetone | 63 | 2.1 | 100° C./1 h heating | 54% | 85% |
| Ex. 13 | Thienoyltrifluoroacetone | 75 | 1.1 | 100° C./1 h heating | 66% | 95% |
| Ex. 14 | Trifluoroacetylacetone | 64 | 1.3 | 80° C./1 h heating | 74% | 91% |
| Ex. 15 | Pivaloyltrifluoroacetone | 88 | 1.4 | 100° C./1 h heating | 72% | 89% |
| Ex. 16 | Furoyltrifluoroacetone | 66 | 1.0 | 80° C./2 h heating | 75% | 90% |
| Ex. 17 | Benzoyltrifluoroacetone | 69 | 1.0 | 100° C./0.5 h heating | 75% | 91% |
| Ex. 18 | Catechol | 53 | 1.5 | 100° C./2 h heating | 59% | 97% |
| Ex. 19 | 8-Quinolinol | 47 | 1.0 | 100° C./1 h heating | 50% | 98% |
| Compar. Ex. 2 | (No addition) | — | — | — | 13% | 48% |

Production Example 4

An autoclave was charged with 0.56 g of zinc hexacyanocobaltate-glyme complex as an epoxide polymerization catalyst, 2,024 g of a polyoxypropylene having an allyl group and a hydroxyl group in each molecule with a number average molecular weight of 1,500 (Unisafe PKA-5014, product of NOF, 0.676 mmol OH/g) as a polymerization initiator and 263 g of propylene oxide, and the polymerization reaction was carried out by heating to 100° C. After the lapse of the induction period, the temperature of the reaction mixture once rose and then dropped. After confirmation of the drop in reaction mixture temperature, additional 4,709 g of propylene oxide was added dropwise over about 5 hours and the inside temperature was maintained at 100 to 110° C. After completion of the dripping, the heating was further continued for 1 hour and then an attempt was made to recover the unreacted monomer by distilling off the volatile matter under reduced pressure. Little was recovered, however. Thus was obtained a polyoxypropylene having an allyl group and a hydroxyl group in each molecule with about 80 ppm of the zinc hexacyanocobaltate-glyme complex mixed therein. The polymer obtained had an allyl group equivalent of 0.172 mmol/g as determined by iodometry and a hydroxyl group equivalent of 0.233 mmol/g as determined by hydroxyl value titrimetry. The metal concentrations in the polymer were calculated based on the amount of the zinc hexacyanocobaltate-glyme complex used at $3.2 \times 10^{-4}$ mmol/g for Zn and $1.6 \times 10^{-4}$ mmol/g for Co.

Example 23

A 50-g portion of the polyoxypropylene produced in Production Example 4 (unpurified; allyl group 8.6 mmol) was placed in a glass reactor, 2,4 mg of 8-quinolinol (1.0 equivalent relative to the Zn contained in the polyoxypropylene) was added in a nitrogen atmosphere, and the mixture was heated at 100° C. for 1 hour. A solution (30 µl) of platinum-divinyltetramethyldisiloxane complex in xylene (platinum metal content 3% by weight) and 0.65 g of dimethoxymethylsilane (0.71 equivalent relative to the allyl group in the polyoxypropylene) were added, and the reaction was allowed to proceed at 80° C. for 4 hours. Upon $^1$H NMR spectrometry, the percent hydrosilylation was found to be 68% and the remaining hydroxyl group percentage 88%.

Example 24

A 102-g portion of the polyoxypropylene produced in Production Example 4. (unpurified; allyl group 17.5 mmol) was placed in a glass reactor, 7.5 mg of trinitrophenol (1.0 equivalent relative to the Zn contained in the polyoxypropylene) was added in a nitrogen atmosphere, and the mixture was heated at 80° C. for 2 hours. A solution (50 µl) of platinum-divinyltetramethyldisiloxane complex in xylene (platinum metal content 3% by weight) and 1.48 g of dimethoxymethylsilane (0.80 equivalent relative to the allyl group in the polyoxypropylene) were added, and the reaction was allowed to proceed at 80° C. for 3 hours. Upon $^1$H NMR spectrometry, the percent hydrosilylation was found to be 72% and the remaining hydroxyl group percentage 95%.

Production Example 5

An autoclave was charged with 0.56 g of zinc hexacyanocobaltate-glyme complex as an epoxide polymerization catalyst, 2,016 g of a polyoxypropylene having an allyl group and a hydroxyl group in each molecule with a number average molecular weight of 1,500 (Unisafe PKA-5014, product of NOF, 0.676 mmol OH/g) as a polymerization initiator and 256 g of propylene oxide for catalyst activation, and the polymerization reaction was carried out by heating to 100° C. After the lapse of the induction period, the temperature of the reaction mixture rose abruptly and then dropped. After confirmation of the drop in reaction mixture temperature, additional 4,760 g of propylene oxide was added dropwise over about 5 hours and the inside temperature was maintained at 100 to 110° C. After completion of the dripping, the heating was further continued for 1 hour and then a trace amount of the unreacted monomer was removed by distilling off the volatile matter under reduced pressure. Thus was obtained a polyoxypropylene having an allyl group and a hydroxyl group in each molecule with about 80 ppm of the zinc hexacyanocobaltate-glyme complex mixed therein (number average molecular weight about 5,000). The polymer obtained had an allyl group equivalent of 0.183 mmol/g as determined by iodometry and a hydroxyl group equivalent of 0.225 mmol/g as determined by hydroxyl value titrimetry.

Production Example 6

An autoclave was charged with 0.56 g of zinc hexacyanocobaltate-glyme complex as an epoxide polymerization catalyst, 2,024 g of a polyoxypropylene having an allyl group and a hydroxyl group in each molecule with a number average molecular weight of 1,500 (Unisafe PKA-5014, product of NOF, 0.676 mmol OH/g) as a polymerization initiator and 263 g of propylene oxide for catalyst activation, and the polymerization reaction was carried out by heating to 100 ° C. After the lapse of the induction period, the temperature of the reaction mixture rose abruptly and then dropped. After confirmation of the drop in reaction mixture temperature, additional 4,709 g of propylene oxide was added dropwise over about 5 hours and the inside temperature was maintained at 100 to 110° C. After completion of the dripping, the heating was further continued for 1 hour and then a trace amount of the unreacted monomer was removed by distilling off the volatile matter under reduced pressure. Thus was obtained a polyoxypropylene having an allyl group and a hydroxyl group in each molecule with about 80 ppm of the zinc hexacyanocobaltate-glyme complex mixed therein (number average molecular weight about 5,000). The polymer obtained had an allyl group equivalent of 0.172 mmol/g as determined by iodometry and a hydroxyl group equivalent of 0.233 mmol/g as determined by hydroxyl value titrimetry.

Example 25

A 49.4-g portion of the polyoxypropylene having an allyl group and a hydroxyl group in each molecule as produced in Production Example 5, with the zinc hexacyanocobaltate-glyme complex mixed therein, was weighed in a glass reactor and, after azeotropic distillation with toluene for water removal, 3.9 mg of succinic anhydride (0.0035 equivalent relative to the hydroxyl group or 2.5 equivalents relative to the zinc) was added. The mixture was heated at 130° C. in a nitrogen atmosphere for 1 hour and then cooled to room temperature, and a solution of platinum-vinylsiloxane complex in xylene (platinum weight 2.3 ppm) and 0.771 g of dimethoxymethylsilane (0.803 equivalent relative to the allyl group in the polyoxypropylene) were added in that order. The reaction was allowed to proceed at 60° C. for 2 hours and then at 90° C. for 1 hour. The percent hydrosilylation reached 78% (allyl group basis). Side reactions, such as hydroxyl-involving condensation or crosslinkable silyl-involving condensation, scarcely occurred.

Then, 1.07 g of hexamethylene diisocyanate (12.7 mmol isocyanato group; 1.14 equivalents relative to hydroxyl) and 11.6 mg of dibutyltin dilaurate (235 ppm) were added at room temperature and the mixture was heated at 120° C. for 3 hours to thereby drive the coupling reaction to completion. Methanol (2 g) was added and the mixture was stirred for 0.5 hour and, after confirming by IR analysis that there was almost no remaining isocyanato group, the volatile matter was removed under reduced pressure. The percent coupling was estimated by GPC analysis to be 93%. A sheet-like cured product was produced from the crosslinkable silyl-terminated polyoxypropylene thus obtained and determined for mechanical characteristics. It showed satisfactory physical properties, namely modulus (at 100% elongation)=0.153 MPa, tensile breaking strength=0.245 MPa and tensile breaking elongation=197% (JIS No. 3 dumbbells; stress rate 200 mm/min).

Example 26

A 103.7-g portion of the polyoxypropylene having an allyl group and a hydroxyl group in each molecule as produced in Production Example 5, with the zinc hexacyanocobaltate-glyme complex mixed therein, was weighed in a glass reactor and, after azeotropic distillation with toluene for water removal, 6.5 mg of salicylic acid (0.0020 equivalent relative to the hydroxyl group or 1.4 equivalents relative to the zinc) was added. The mixture was heated at 130° C. in a nitrogen atmosphere for 30 minutes and then cooled to room temperature, and a solution of the platinum-vinylsiloxane complex in xylene (platinum weight 2.1 ppm) and 1.637 g of dimethoxymethylsilane (0.813 equivalent relative to the allyl group) were added in that order. The reaction was allowed to proceed at 80° C. for 3 hours, whereupon the percent hydrosilylation reached 77% (allyl group basis). Side reactions, such as hydroxyl-involving condensation or crosslinkable silyl-involving condensation, hardly occurred.

Then, 2.16 g of hexamethylene diisocyanate (25.4 mmol isocyanato group; 1.092 equivalents relative to hydroxyl) and 11.3 mg of dibutyltin bis(isooctyl thioglycolate) (109 ppm) were added at room temperature and the mixture was heated at 100° C. for 3 hours to thereby drive the coupling reaction to completion. Methanol (5 g) was added and the mixture was stirred for 0.5 hour and, after confirming by IR analysis that there was almost no remaining isocyanato group, the volatile matter was removed under reduced pressure. The percent coupling was estimated by GPC analysis to be 97%.

Dibutyltin bisacetylacetonate (1.06 g, 1.02 parts by weight) was added, as a curing catalyst, to the crosslinkable silyl group-containing polyoxypropylene thus obtained and the mixture was placed in tightly closed containers and evaluated for storage stability at 23° C. and 50° C. The curing time and viscosity were followed for 5 weeks. Both the samples stored at 23° C. and at 50° C. caused no problems and it was confirmed that the mixture can be stored stably for a prolonged period. A sheet-like cured product produced from this crosslinkable silyl group-containing polyoxypropylene showed satisfactory physical characteristics, namely modulus (at 100% elongation)= 0.180 MPa, tensile breaking strength=0.281 MPa and tensile breaking elongation=186% (JIS No. 3 dumbbells; stress rate 200 mm/min)

Example 27

A 109.1-g portion of the polyoxypropylene having an allyl group and a hydroxyl group in each molecule as produced in Production Example 6, with the zinc hexacyanocobaltate-glyme complex mixed therein, was weighed in a glass reactor and, after azeotropic distillation with toluene for water removal, $1.6 \times 10^{-2}$ mmol (0.48 equivalent relative to the zinc) of thienoyltrifluoroacetone and 0.12 mmol (3.6 equivalents relative to the zinc) of p-hydroxybenzoic acid were added. The mixture was heated at 100° C. in a nitrogen atmosphere for 1 hour and then cooled to room temperature, and a solution of the platinum-vinylsiloxane complex in xylene (platinum weight 5.1 ppm) and 1.729 g of dimethoxymethylsilane (0.799 equivalent relative to the allyl group) were added in that order. The reaction was allowed to proceed at 80° C. for 4 hours, whereupon the percent hydrosilylation reached 73% (allyl group basis). Side reactions, such as hydroxyl-involving condensation or crosslinkable silyl-involving condensation, scarcely occurred.

Then, 2.13 g of hexamethylene diisocyanate (25.1 mmol isocyanato group; 1.00 equivalent relative to hydroxyl) and 11 mg of dibutyltinbis(isooctylthioglycolate) (101 ppm) were added at room temperature and the mixture was heated at 100° C. for 11 hours to thereby drive the coupling reaction to completion. Methanol (4 g) was added and the mixture was stirred for 0.5 hour and, after confirming by IR analysis that there was almost no remaining isocyanato group, the volatile matter was removed under reduced pressure. The percent coupling was estimated by GPC analysis to be 99%.

A sheet-like cured product was produced from the crosslinkable silyl-terminated polyoxypropylene thus obtained and determined for physical characteristics. It showed satisfactory physical properties, namely modulus (at 100% elongation)=0.179 MPa, tensile breaking strength= 0.274 MPa and tensile breaking elongation=188% (JIS No. 3 dumbbells; stress rate 200 mm/min).

Example 28

A 106.6-g portion of the polyoxypropylene having an allyl group and a hydroxyl group in each molecule as produced in Production Example 6, with the zinc hexacyanocobaltate-glyme complex mixed therein, was weighed in a glass reactor and, after azeotropic distillation with toluene for water removal, $7.62 \times 10^{-2}$ mmol (2.3 equivalent relative to the zinc) of monoethyl succinate was added. The mixture was heated at 100° C. in a nitrogen atmosphere for 1 hour and then cooled to room temperature, and a solution of the platinum-vinylsiloxane complex in xylene (platinum weight 2.2 ppm) and 1.698 g of dimethoxymethylsilane (0.803 equivalent relative to the allyl group) were added in that order. The reaction was allowed to proceed at 80° C. for 8 hours, where upon the percent hydrosilylation reached 72% (allyl group basis). The residual hydroxyl percentage was 92%.

Then, 1.93 g of hexamethylene diisocyanate (22.7 mmol isocyanato group; 0.923 equivalent relative to hydroxyl) and 11.3 mg of dibutyltinbis(isooctylthioglycolate) (106 ppm) were added at room temperature and the mixture was heated at 100° C. for 6 hours to thereby drive the coupling reaction to completion. Methanol (5 g) was added and the mixture was stirred for 0.5 hour and the volatile matter was removed under reduced pressure. IR analysis revealed almost no remaining isocyanato group and the percent coupling was estimated by GPC analysis to be 92%.

A sheet-like cured product was produced from the crosslinkable silyl-terminated polyoxypropylene thus obtained and determined for physical characteristics. It showed satisfactory physical properties, namely modulus (at 100% elongation)=0.131 MPa, tensile breaking strength= 0.185 MPa and tensile breaking elongation=170% (JIS No. 3 dumbbells; stress rate 200 mm/min).

Example 29

A 107.6-g portion of the polyoxypropylene having an allyl group and a hydroxyl group in each molecule as produced in Production Example 6, with the zinc hexacyanocobaltate-glyme complex mixed therein, was weighed in a glass reactor and, after azeotropic distillation with toluene for water removal, 14.5 mg (0.105 mmol; 3.13 equivalent relative to the zinc) of salicylic acid was added. The mixture was heated at 100° C. in a nitrogen atmosphere for 1 hour and then cooled to room temperature, and a solution of the platinum-vinylsiloxane complex in xylene (platinum weight 5.1 ppm) and 1.708 g of dimethoxymethylsilane (0.800 equivalent relative to the allyl group) were added in that order. The reaction was allowed to proceed at 80° C. for 2 hours, where upon the percent hydrosilylation reached 74% (allyl group basis). The residual hydroxyl percentage was 97%. The thus-obtained polyoxypropylene having a crosslinkable silyl group and a hydroxyl group in each molecule was allowed to stand at room temperature for 20 days. Almost no changes were observed in hydrosilylation and residual hydroxyl percentages.

Then, 1.965 g of hexamethylene diisocyanate (23.16 mmol isocyanato group; 0.935 equivalent relative to hydroxyl) and 10.2 mg of dibutyltin bis(isooctyl thioglycolate) (95 ppm) were added at room temperature and the mixture was heated at 100° C. for 5 hours to thereby drive the coupling reaction to completion. Methanol (5 g) was added and the mixture was stirred for 0.5 hour and the volatile matter was removed under reduced pressure. IR analysis revealed almost no remaining isocyanato group and the percent coupling was estimated by GPC analysis to be 93%.

A sheet-like cured product was produced from the crosslinkable silyl-terminated polyoxypropylene thus obtained and determined for physical characteristics. It showed satisfactory physical properties, namely modulus (at 100% elongation)=0.159 MPa, tensile breaking strength= 0.237 MPa and tensile breaking elongation=180% (JIS No. 3 dumbbells; stress rate 200 mm/min).

Example 30

A 79.50-g portion of the polyoxypropylene having an allyl group and a hydroxyl group in each molecule as produced in Production Example 6, with the zinc hexacyanocobaltate-glyme complex mixed therein, was weighed in a glass reactor and, after azeotropic distillation with toluene for water removal, 7.9 mg of succinic anhydride was added. The mixture was heated at 100° C. in a nitrogen atmosphere for 1 hour and then cooled to room temperature, and a solution of the platinum-vinylsiloxane complex in xylene (platinum weight 5.0 ppm) and 1.354 g of dimethoxymethylsilane (0.873 equivalent relative to the allyl group) were added in that order. The reaction was allowed to proceed at 80° C. for 4 hours, whereupon the percent hydrosilylation reached 78% (allyl group basis).

Then, 0.622 g of hexamethylene diisocyanate (0.404 equivalent isocyanato group relative to the hydroxyl group), 3.598 g of Sumidur HT (hexamethylene diisocyanate-trimethylolpropane adduct; ethyl acetate solution; product of Sumitomo Bayer Urethane) (0.609 equivalent isocyanato group relative to the hydroxyl group) and 4.0 mg of dibutyltin bis(isooctyl thioglycolate) (52 ppm) were added and the mixture was heated at 80° C. for 3 hours and at 100° C. for 2 hours to thereby drive the coupling reaction to completion. Methanol (3 g) was added, the mixture was stirred for 0.5 hour, and the volatile matter was removed under reduced pressure. IR analysis revealed almost no remaining isocyanato group and the percent coupling was estimated by GPC analysis to be 96%.

A sheet-like cured product was produced from the crosslinkable silyl-terminated polyoxypropylene thus obtained and determined for physical characteristics. It showed satisfactory physical properties, namely modulus (at 100% elongation)=0.389 MPa, tensile breaking strength= 0.490 MPa and tensile breaking elongation=147% (JIS No. 3 dumbbells; stress rate 200 mm/min).

Example 31

A 80.5-g portion of the polyoxypropylene having an allyl group and a hydroxyl group in each molecule as produced in Production Example 6, with the zinc hexacyanocobaltate-glyme complex mixed therein, was weighed in a glass reactor and, after azeotropic distillation with toluene for water removal, 7.9 mg of succinic anhydride was added. The mixture was heated at 100° C. in a nitrogen atmosphere for 1 hour and then cooled to room temperature, and a solution of the platinum-vinylsiloxane complex in xylene (platinum weight 5.0 ppm) and 1.253 g of dimethoxymethylsilane (0.799 equivalent relative to the allyl group) were added in that order. The reaction was allowed to proceed at 80° C. for 4 hours, whereupon the percent hydrosilylation reached 73% (allyl group basis).

Then, 0.755 g of hexamethylene diisocyanate (0.498 equivalent isocyanato group relative to the hydroxyl group), 2.996 g of Sumidur HT (hexamethylene diisocyanate-trimethylolpropane adduct; ethyl acetate solution; product of Sumitomo Bayer Urethane) (0.501 equivalent isocyanato group relative to the hydroxyl group) and 4.0 mg of dibutyltin bis(isononyl 3-mercaptopropionate) (53 ppm) were added and the mixture was heated at 80° C. for 3 hours and at 100° C. for 2 hours to thereby drive the coupling reaction to completion. Methanol (3 g) was added, the mixture was stirred for 0.5 hour, and the volatile matter was removed under reduced pressure. The percent coupling was estimated by GPC analysis to be 97%.

A sheet-like cured product was produced from the crosslinkable silyl-terminated polyoxypropylene thus obtained and determined for physical characteristics. It showed satisfactory physical properties, namely modulus (at 100% elongation)=0.313 MPa, tensile breaking strength=0.317 MPa and tensile breaking elongation=109% (JIS No. 3 dumbbells; stress rate 200 mm/min).

Example 32

A 100.5-g portion of the polyoxypropylene having an allyl group and a hydroxyl group in each molecule as produced in Production Example 5, with the zinc hexacyanocobaltate-glyme complex mixed therein, was weighed in a glass reactor and, after azeotropic distillation with toluene for water removal, 4.7 mg of 8-quinolinol (0.0014 equivalent relative to the hydroxyl group; 1.0 equivalent relative to the zinc) was added. The mixture was heated at 100° C. in a nitrogen atmosphere for 1 hour and then cooled to room temperature, and a solution of the platinum-vinylsiloxane complex in xylene (platinum weight 8.6 ppm) and 1.563 g of dimethoxymethylsilane (0.800 equivalent relative to the allyl group in the polyoxypropylene) were added in that order. The reaction was allowed to proceed at 60° C. for 6 hours, where upon the percent hydrosilylation reached 72% (allyl group basis). Side reactions, such as hydroxyl-involving condensation or crosslinkable silyl-involving condensation, scarcely occurred.

Then, 1.97 g of toluenediisocyanate (22.6 mmol isocyanato group; 1.0 equivalent relative to the hydroxyl group) and 8 mg of dibutyltin bis(isononyl 3-mercaptopropionate) (80 ppm) were added at room temperature and the mixture was heated at 100° C. for 3 hours to thereby drive the coupling reaction to completion. Methanol (3 g) was added, the mixture was stirred for 0.5 hour, and the volatile matter was removed under reduced pressure. IR analysis revealed almost no remaining isocyanato group and the percent coupling was estimated by GPC analysis to be 95%.

A sheet-like cured product was produced from the crosslinkable silyl-terminated polyoxypropylene thus obtained and determined for physical characteristics. It showed satisfactory physical properties, namely modulus (at 100% elongation)=0.133 MPa, tensile breaking strength=0.215 MPa and tensile breaking elongation=245% (JIS No. 3 dumbbells; stress rate 200 mm/min).

Example 33

A 89.6-g portion of the polyoxypropylene having an allyl group and a hydroxyl group in each molecule as produced in Production Example 5, with the zinc hexacyanocobaltate-glyme complex mixed therein, was weighed in a glass reactor and, after azeotropic distillation with toluene for water removal, 4.2 mg of 8-quinolinol (0.0014 equivalent relative to the hydroxyl group; 1.0 equivalent relative to the zinc) was added. The mixture was heated at 100° C. in a nitrogen atmosphere for 1 hour and then cooled to room temperature, and a solution of the platinum-vinylsiloxane complex in xylene (platinum weight 10.0 ppm) and 1.393 g of dimethoxymethylsilane (0.800 equivalent relative to the allyl group in the polyoxypropylene) were added in that order. The reaction was allowed to proceed at 80° C. for 2hours, where upon the percent hydrosilylation reached 76% (allyl group basis). Side reactions, such as hydroxyl-involving condensation or crosslinkable silyl-involving condensation, scarcely occurred.

Then, 1.19 g of dimethyl oxalate (10.1 mmol ester group; 1.0 equivalent relative to the hydroxyl group) and 2.7 mg of titanium triisopropoxide (30 ppm relative to the polyoxypropylene) were added, and the mixture was heated at 100° C. for 10 hours while the pressure was reduced to 5 to 2 mm Hg and the byproduct methanol was distilled off. The percent coupling was estimated by GPC analysis to be 91%.

A sheet-like cured product was produced from the crosslinkable silyl-terminated polyoxypropylene thus obtained and determined for physical characteristics. It showed satisfactory physical properties, namely modulus (at 100% elongation)=0.121 MPa, tensile breaking strength=0.219 MPa and tensile breaking elongation=283% (JIS No. 3 dumbbells; stress rate 200 mm/min).

Example 34

A 104.2-g portion of the polyoxypropylene having an allyl group and a hydroxyl group in each molecule as produced in Production Example 5, with the zinc hexacyanocobaltate-glyme complex mixed therein, was weighed in a glass reactor and, after azeotropic distillation with toluene for water removal, 15.3 mg of 2,4,6-trinitrophenol (0.0028 equivalent relative to the hydroxyl group; 2.0 equivalents relative to the zinc) was added. The mixture was heated at 100° C. in a nitrogen atmosphere for 1 hour and then cooled to room temperature, and a solution of the platinum-vinylsiloxane complex in xylene (platinum weight 9.9 ppm) and 1.641 g of dimethoxymethylsilane (0.810 equivalent relative to the allyl group in the polyoxypropylene) were added in that order. The reaction was allowed to proceed at 80° C. for 4 hours, where upon the percent hydrosilylation reached 77% (allyl group basis). Side reactions, such as hydroxyl-involving condensation or crosslinkable silyl-involving condensation, scarcely occurred.

Then, 2.61 g of isophoronediisocyanate (23.5 mmol isocyanato group; 1.0 equivalent relative to the hydroxyl group) and 5 mg of dibutyltin dilaurate (50 ppm) were added at room temperature, and the mixture was heated at 100° C. for 3 hours to thereby drive the coupling reaction to completion. Methanol (3 g) was added, the mixture was stirred for 0.5 hour, and the volatile matter was removed under reduced pressure. IR analysis revealed almost no remaining isocyanato group and the percent coupling was estimated by GPC analysis to be 96%.

A sheet-like cured product was produced from the crosslinkable silyl-terminated polyoxypropylene thus obtained and determined for physical characteristics. It showed satisfactory physical properties, namely modulus (at 100% elongation)=0.179 MPa, tensile breaking strength= 0.255 MPa and tensile breaking elongation=162% (JIS No. 3 dumbbells; stress rate 200 mm/min).

Example 35

A 98.5-g portion of the polyoxypropylene having an allyl group and a hydroxyl group in each molecule as produced in Production Example 5, with the zinc hexacyanocobaltate-glyme complex mixed therein, was weighed in a glass reactor and, after azeotropic distillation with toluene for water removal, 10.9 mg of 2,4,6-trinitrophenol (0.0021 equivalent relative to the hydroxyl group; 1.5 equivalents relative to the zinc) was added. The mixture was heated at 100° C. in a nitrogen atmosphere for 1 hour and then cooled to room temperature, and a solution of the platinum-vinylsiloxane complex in xylene (platinum weight 14.1 ppm) and 1.532 g of dimethoxymethylsilane (0.800 equivalent relative to the allyl group in the polyoxypropylene) were added in that order. The reaction was allowed to proceed at 80° C. for 5 hours, where upon the percent hydrosilylation reached 74% (allyl group basis). Side reactions, such as hydroxyl-involving condensation or crosslinkable silyl-involving condensation, hardly occurred.

Then, 0.998 g of dimethyl carbonate (0.50 equivalent relative to the hydroxyl group) and 9.9 mg of potassium carbonate were added, and the mixture was heated at 90° C. For removing the byproduct methanol, internal pressure of the system was gradually reduced and, in 10 hours, the coupling yield reached 85%. During the reaction, the degree of vacuum and the reflux ratio were so adjusted that the dimethyl carbonate would return to the reaction system.

A sheet-like cured product was produced from the crosslinkable silyl-terminated polyoxypropylene thus obtained and determined for physical characteristics. It showed satisfactory physical properties, namely modulus (at 100% elongation)=0.112 MPa, tensile breaking strength= 0.203 MPa and tensile breaking elongation=325% (JIS No. 3 dumbbells; stress rate 200 mm/min).

Example 36

A 103.9-g portion of the polyoxypropylene having an allyl group and a hydroxyl group in each molecule as produced in Production Example 5, with the zinc hexacyanocobaltate-glyme complex mixed therein, was weighed in a glass reactor and, after azeotropic distillation with toluene for water removal, 6.5 mg of salicylic acid (0.0020 equivalent relative to the hydroxyl group; 1.4 equivalents relative to the zinc) was added. The mixture was heated at 100° C. in a nitrogen atmosphere for 1 hour and then cooled to room temperature, and a solution of the platinum-vinylsiloxane complex in xylene (platinum weight 4.1 ppm) and 1.63 g of dimethoxymethylsilane (0.81 equivalent relative to the allyl group) were added in that order. The reaction was allowed to proceed at 80° C. for 2 hours, whereupon the percent hydrosilylation reached 78% (allyl group basis). Side reactions, such as hydroxyl-involving condensation or crosslinkable silyl-involving condensation, scarcely occurred.

Then, 2.97 g of hexamethylene diisocyanate (34.9 mmol isocyanato group; 1.50 equivalents relative to the hydroxyl group) and 11.2 mg of dibutyltin bis(isooctyl thioglycolate) (109 ppm) were added at room temperature, and the mixture was heated at 100° C. for 3 hours to thereby drive the urethane formation reaction to completion.

Then, 2.60 g of trimethylolpropane (20% by weight solution in THF) (1.0 equivalent on the hydroxyl group basis relative to the excess isocyanato group) was added, and the mixture was heated at 100° C. for 3 hours. Methanol (5 g) was added and the mixture was stirred for 1 hour. After confirming by IR analysis that there was no remaining isocyanato group, the volatile matter was removed under reduced pressure. The formation of the trimer and dimer of the starting material polyoxypropylene was confirmed by GPC analysis. It was also confirmed that the residual uncoupled material amounted to 4%.

A sheet-like cured product was produced from the crosslinkable silyl-terminated polyoxypropylene thus obtained and determined for physical characteristics. The sheet showed satisfactory physical properties, namely modulus (at 100% elongation)=0.267 MPa, tensile breaking strength=0.305 MPa and tensile breaking elongation=115% (JIS No. 3 dumbbells; stress rate 200 mm/min).

Example 37

The series of reactions from polymerization to coupling were carried out in one and the same reaction vessel, as follows.

An autoclave was charged with 0.40 g of zinc hexacyanocobaltate-glyme complex as an epoxide polymerization catalyst, 1,503 g of a polyoxypropylene having an allyl group and a hydroxyl group in each molecule with a number average molecular weight of 1,500 (Unisafe PKA-5014, product of NOF, 0.706 mmol OH/g) as a polymerization initiator and 189 g of propylene oxide, and the polymerization reaction was carried out by heating to 100° C. After the lapse of the induction period, the temperature of the reaction mixture rose abruptly and then dropped. After confirmation of the drop in reaction mixture temperature, additional 3,204 g of propylene oxide was added dropwise over about 5 hours and the inside temperature was maintained at 100 to 110° C. After completion of the dripping, the heating was further continued for 1 hour and then a trace amount of the unreacted monomer was removed by distilling off the volatile matter under reduced pressure. Thus was obtained a polyoxypropylene having an allyl group and a hydroxyl group in each molecule with about 80 ppm of the zinc hexacyanocobaltate-glyme complex mixed therein. The polymer obtained had an allyl group equivalent of 0.186 mmol/g as determined by iodometry and a hydroxyl group equivalent of 0.239 mmol/g as determined by hydroxyl value titrimetry. The number average molecular weight was about 5000.

To the thus-obtained polyoxypropylene (4,662 g; 867 mmol allyl group) having an allyl group and a hydroxyl group in each molecule as produced in the above manner, with the zinc hexacyanocobaltate-glyme complex mixed therein, was added 0.4 g of salicylic acid, and the mixture was heated at 100° C. in a nitrogen atmosphere for 0.5 hour and then cooled to 80° C., and a solution of the platinum-vinylsiloxane complex in xylene (platinum weight 10 ppm) and 74 g of dimethoxymethylsilane (0.80 equivalent relative to the allyl group in the polyoxypropylene) were added in that order. The reaction was allowed to proceed at 80° C. for 2 hours and the volatile matter was then removed under reduced pressure to give a polyoxypropylene having a crosslinkable silyl group and a hydroxyl group in each molecule. The percent hydrosilylation determined by 1H-NMR spectrometry was 75% (allyl group basis). Side reactions, such as hydroxyl-involving condensation or crosslinkable silyl-involving condensation, hardly occurred. GPC analysis revealed little change in molecular weight distribution after the hydrosilylation reaction as compared with the distribution before the reaction.

To the polyoxypropylene having a crosslinkable silyl group and a hydroxyl group in each molecule (3,964 g; 950 mmol hydroxyl group) obtained in the above manner were added at room temperature 78.8 g of hexamethylene diisocyanate (930 mmol isocyanato group; 0.98 equivalent relative to the hydroxyl group) and 0.42 g of dibutyltin bis(octyl thioglycolate) (110 ppm), and the mixture was heated at 100° C. for 6 hours. The residual isocyanato group percentage determined by IR analysis was 4%. Methanol (59 g) was added, the mixture was stirred for 0.5 hour and, after confirming the absence of the isocyanate-due absorption by IR analysis, the volatile matter was removed under reduced pressure. The coupling rate was estimated by GPC analysis to be 92%.

To 100 weight parts of the crosslinkable silyl-terminated polyoxypropylene thus obtained was added, as a catalyst, a mixture of 3 weight parts of stannous octylate and 0.5 weight part of laurylamine, and a sheet-like cured product was produced and determined for mechanical characteristics. It showed satisfactory physical properties, namely modulus (at 100% elongation)=0.167 MPa, tensile breaking strength=0.267 MPa and tensile breaking elongation=207% (JIS No. 3 dumbbells; stress rate 200 mm/min).

Comparative Example 4

A 76.5-g portion of the polyoxypropylene having an allyl group and a hydroxyl group in each molecule as produced in Production Example 5, with the zinc hexacyanocobaltate-glyme complex mixed therein, was weighed in a glass reactor and, after azeotropic distillation with toluene for water removal, a solution of the platinum-vinylsiloxane complex in xylene (platinum weight 2.6 ppm) and 1.14 g of dimethoxymethylsilane (0.80 equivalent relative to the allyl group) were added at room temperature. The reaction was allowed to proceed at 80° C. for 3 hours, whereupon the percent hydrosilylation attained was only 20% (allyl group basis). In addition, the remaining hydroxyl group percentage was found to have lowered to 60%, indicating the progress of the condensation reaction between hydroxyl and crosslinkable silyl groups.

An attempt was made to effect the urethane coupling reaction using hexamethylene diisocyanate. However, due to the insufficient amount of the remaining hydroxyl group, any satisfactory coupling product could not be obtained.

Comparative Example 5

The order of reactions was reversed. Thus, the hydrosilylation reaction was attempted after carrying out the coupling reaction. A 640.3-g portion of the polyoxypropylene having an allyl group and a hydroxyl group in each molecule as produced in Production Example 6, with the zinc hexacyanocobaltate-glyme complex mixed therein, was weighed in a glass reactor and, after azeotropic distillation with toluene for water removal, 12.40 g of hexamethylene diisocyanate (147.4 mmol isocyanato group; 1.00 equivalent relative to the hydroxyl group) and 69.6 mg (109 ppm) of dibutyltin bis(isooctyl thioglycolate) were added. The mixture was heated at 100° C. in a nitrogen atmosphere for 3 hours, whereupon the coupling was completed with a yield of 98%.

Then, 64 mg (100 ppm) of succinic anhydride was added, the mixture was heated at 100° C. for 1 hour and then cooled to room temperature, and a solution of the platinum-vinylsiloxane complex in xylene (platinum weight 3.1 ppm) and 10.16 g of dimethoxymethylsilane (0.800 equivalent relative to the allyl group) were added and the mixture was heated at 80° C. for 3 hours. The hydrosilylation reaction proceeded only to 34% (allyl group basis) and the formation of dimethoxymethylsilane-derived decomposition and condensation products was observed. Supposedly, the carbamate groups and dibutyltin bis(isooctyl thioglycolate) occurring in the system inhibited the hydrosilylation reaction and promoted side reactions.

What is claimed is:

1. A method of producing a polyoxyalkylene polymer having at least one crosslinkable silyl group and at least one hydroxyl group in each molecule, which comprises:

treating with a metal-coordinating compound a polyoxyalkylene polymer having at least one unsaturated group and at least one alcoholic hydroxyl group in each molecule and an impurity double metal cyanide complex mixed therein;

and adding thereto a compound having a hydrogen-silicon bond and a crosslinkable silyl group in each molecule and a hydrosilylation catalyst to thereby carry out a hydrosilylation reaction.

2. The production method according to claim 1, wherein the double metal cyanide complex is a zinc hexacyanocobaltate-containing complex.

3. The production method according to claim 1 or 2, wherein the metal-coordinating compound is at least one selected from the group consisting of carboxylic acids, carboxylic acid derivatives, chelating agents and phenolic hydroxyl-containing compounds.

4. The production method according to claim 3, wherein the carboxylic acid derivative is a carboxylic acid anhydride.

5. The production method according to claim 3, wherein the chelating agent is represented by the general formula (1):

$$RC(O)CH_2C(O)R$$

wherein the R's are the same or different and each represents a substituted or unsubstituted alkyl group, a substituted or unsubstituted cycloalkyl group, a substituted or unsubstituted aryl group, a substituted or unsubstituted univalent heterocyclic group or a substituted or unsubstituted aralkyl group.

6. The production method according to 1 or 2, wherein said treating step is carried out at a temperature not lower than 50° C.

7. The production method according to claim 1 or 2, wherein the hydrosilylation catalyst is a platinum-containing complex.

8. The production method according to claim 1 or 2, wherein the hydrosilylation yield is not less than 50% on the unsaturated group basis and the remaining hydroxyl group percentage after the hydrosilylation reaction is not less than 80% as compared with the hydroxyl group content before the hydrosilylation reaction.

9. A method of producing a crosslinkable silyl group-containing polyoxyalkylene polymer which comprises (a) treating with a metal-coordinating compound, a polyoxyalkylene polymer having at least one unsaturated group and at least one alcoholic hydroxyl group in each molecule and an impurity double metal cyanide complex mixed therein, then adding thereto a compound having a hydrogen-silicon bond and a crosslinkable silyl group in each molecule and a hydrosilylation catalyst to thereby carry out the hydrosilylation reaction to give a polyoxyalkylene polymer having at least one crosslinkable silyl group and at least one hydroxyl group in each molecule and (b) carrying out a coupling reaction in which the hydroxyl group occurring in the polymer is involved.

10. The production method according to claim 9, wherein said treating step is carried out at a temperature not lower than 50° C.

11. The production method according to claim 10, wherein the polyoxyalkylene polymer having at least one unsaturated group and at least one alcoholic hydroxyl group in each molecule is produced by a process involving a polymerization reaction using a double metal cyanide complex as a catalyst.

12. The production according to claim 10 or 11, wherein the double metal cyanide complex is a zinc hexacyanocobaltate-containing complex.

13. The production method according to claim 9 or 11, wherein the polyoxyalkylene polymer having at least one unsaturated group and at least one alcoholic hydroxyl group in each molecule has a number average molecular weight of not less than 3,000.

14. The production method according to any of claim 9 to 11, wherein the metal-coordinating compound is at least one member selected from the group consisting of carboxylic acids, carboxylic acid derivatives, chelating agents and phenolic hydroxyl-containing compounds.

15. The production method according to any of claims 9 to 11, wherein the hydrosilylation catalyst is a platinum-containing complex.

16. The production method according to any of claims 9 to 11, wherein the coupling reaction is carried out with a polyoxyalkylene polymer having at least one crosslinkable silyl group and at least one hydroxyl group in each molecule and a compound having at least two isocyanato groups in each molecule.

17. The production method according to claim 16, wherein the coupling reaction is carried out using a sulfur atom-containing tin catalyst as a catalyst.

18. The production method according to claim 16, wherein the compound having at least two isocyanato groups in each molecule is an aliphatic diisocyanate compound and/or an aliphatic triisocyanate compound.

19. The production method according to any of claims 9 to 11, wherein the coupling reaction is effected, after reacting a polyoxyalkylene polymer having at least one crosslinkable silyl group and at least one hydroxyl group in each molecule with a compound having at least two isocyanato groups in each molecule in a relative amount ratio such that the isocyanato group is in excess relative to the hydroxyl group, by causing the unreacted isocyanato group to further react with a compound having at least two active hydrogen atoms in each molecule.

20. A method of producing a crosslinkable silyl group-containing polyoxyalkylene polymer according to any of claims 9 to 11, wherein the coupling reaction yield, determined as the ratio of coupled polymer to total polymer, is not less than 80%.

* * * * *